US012656648B2

(12) United States Patent
Fang et al.

(10) Patent No.: US 12,656,648 B2
(45) Date of Patent: Jun. 16, 2026

(54) DISPLAY SUBSTRATE AND MANUFACTURING METHOD THEREFOR, DISPLAY PANEL AND DISPLAY DEVICE

(71) Applicants: Ordos Yuansheng Optoelectronics Co., Ltd., Ordos (CN); BOE Technology Group Co., Ltd., Beijing (CN)

(72) Inventors: Yezhou Fang, Beijing (CN); Liang Tian, Beijing (CN); Xinguo Wu, Beijing (CN); Fengguo Wang, Beijing (CN); Zhixiang Wang, Beijing (CN); Guojiang Yu, Beijing (CN); Bo Huang, Beijing (CN); Zhiang Guo, Beijing (CN); Yaozu Liu, Beijing (CN)

(73) Assignees: Ordos Yuansheng Optoelectronics Co., Ltd., Ordos (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/700,337

(22) PCT Filed: Oct. 28, 2022

(86) PCT No.: PCT/CN2022/128391
§ 371 (c)(1),
(2) Date: Apr. 11, 2024

(87) PCT Pub. No.: WO2024/087210
PCT Pub. Date: May 2, 2024

(65) Prior Publication Data
US 2025/0224642 A1 Jul. 10, 2025

(51) Int. Cl.
*G02F 1/1362* (2006.01)
*G02F 1/1368* (2006.01)

(52) U.S. Cl.
CPC .. *G02F 1/136295* (2021.01); *G02F 1/136227* (2013.01); *G02F 1/1368* (2013.01)

(58) Field of Classification Search
CPC ........... G02F 1/134363; G02F 1/13394; G02F 1/136295; G02F 1/1368; G02F 1/136227
See application file for complete search history.

(56) References Cited

U.S. PATENT DOCUMENTS

| | | | | |
|---|---|---|---|---|
| 2004/0095545 A1* | 5/2004 | Washizawa | ......... | G02F 1/13394 349/155 |
| 2007/0291217 A1* | 12/2007 | Kang | ................ | G02F 1/136227 349/156 |
| 2009/0147208 A1* | 6/2009 | Tatemori | ............. | G02F 1/13394 349/156 |

FOREIGN PATENT DOCUMENTS

| | | |
|---|---|---|
| CN | 101789426 A | 7/2010 |
| CN | 105093709 A | 11/2015 |

(Continued)

OTHER PUBLICATIONS

KR 20150076348 A machine translation (Year: 2015).*

*Primary Examiner* — James A Dudek
(74) *Attorney, Agent, or Firm* — Workman Nydegger

(57) ABSTRACT

A display substrate and a manufacturing method therefor, a display panel and a display device. The display substrate includes: a base substrate; and an organic layer located at a side of the base substrate and including a planarization layer and a plurality of support structures. The planarization layer includes a group of vias, the support structures are disposed on a side of the planarization layer away from the base substrate and integrated with the planarization layer. Orthographic projections of the support structures on the base substrate do not overlap with orthographic projections of the vias on the base substrate.

16 Claims, 25 Drawing Sheets

(56) References Cited

FOREIGN PATENT DOCUMENTS

| CN | 107706226 | A | 2/2018 |
| CN | 110928007 | A | 3/2020 |
| CN | 114236926 | A | 3/2022 |
| JP | 2006201218 | A | 8/2006 |
| KR | 20080079141 | A | 8/2008 |
| KR | 20150076348 | A | 7/2015 |

* cited by examiner

BP 3.5μm h

1022

10231

10231 d

Lk₂ e

10232

$h_1$

10231 f $Lk_2$ $h_2$

10232

$h_1$

10231 g $Lk_2$ $h_2$

10232

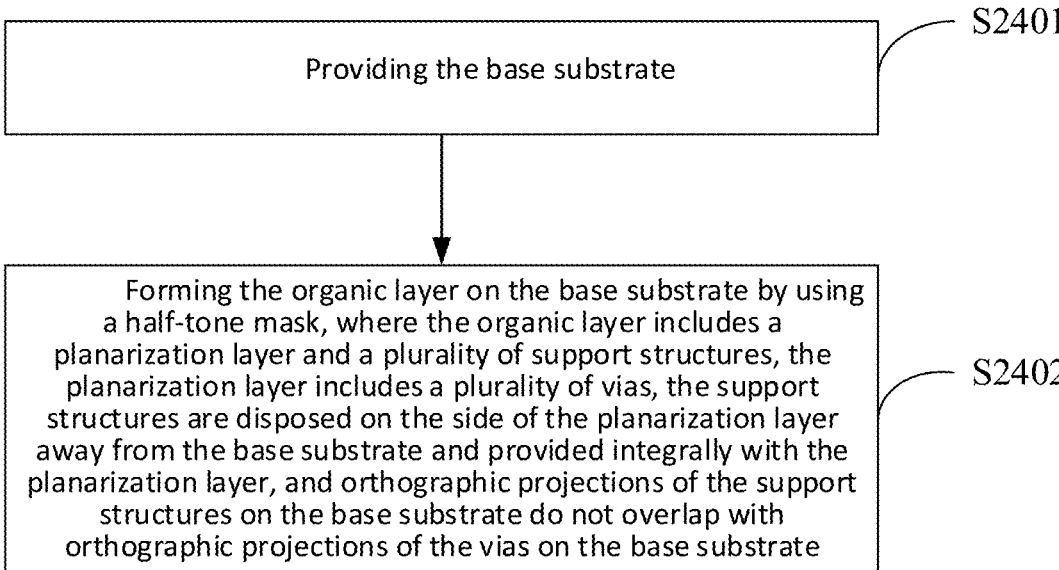

S2401

Providing the base substrate

S2402

Forming the organic layer on the base substrate by using a half-tone mask, where the organic layer includes a planarization layer and a plurality of support structures, the planarization layer includes a plurality of vias, the support structures are disposed on the side of the planarization layer away from the base substrate and provided integrally with the planarization layer, and orthographic projections of the support structures on the base substrate do not overlap with orthographic projections of the vias on the base substrate

FIG. 24

DISPLAY SUBSTRATE AND MANUFACTURING METHOD THEREFOR, DISPLAY PANEL AND DISPLAY DEVICE

CROSS REFERENCE TO RELATED APPLICATIONS

This application is a national phase entry under 35 U.S.C. § 371 of International Application No. PCT/CN2022/128391, filed on Oct. 28, 2022, the entire content of which is incorporated herein by reference.

TECHNICAL FIELD

The disclosure relates to the field of display technology, and in particular, to a display substrate and a manufacturing method therefor, a display panel and a display device.

BACKGROUND

The Liquid Crystal Display (LCD) has the advantages of light weight, low power consumption, high image quality, low radiation and easy portability, has gradually replaced the traditional Cathode Ray Tube (CRT) display device, and is widely used in modern information device, such as Augmented Reality (AR)/Virtual Reality (VR) display device, laptop, television, mobile phone and digital product, etc.

SUMMARY

Embodiments of the disclosure provide a display substrate and a manufacturing method therefor, a display panel and a display device. The specific solutions are as follows.

In one aspect, embodiments of the disclosure provide a display substrate, including: a base substrate; and an organic layer disposed at a side of the base substrate. The organic layer includes a planarization layer and a plurality of support structures. The planarization layer includes a plurality of vias, the support structures are located on a side of the planarization layer away from the base substrate and integrated with the planarization layer, and orthographic projections of the support structures on the base substrate do not overlap with orthographic projections of the vias on the base substrate.

In some embodiments, in the above display substrate provided in the embodiments of the disclosure, the organic layer further includes a plurality of platform structures disposed on the side of the planarization layer away from the base substrate and integrated with the planarization layer, and the vias extend to pass through the platform structures.

In some embodiments, in the above display substrate provided in the embodiments of the disclosure, a minimum distance between an outer surface of the platform structure away from the via and the via is greater than or equal to 5 μm.

In some embodiments, the above display substrate provided in the embodiments of the disclosure further includes a plurality of transistors between the organic layer and the base substrate, and a plurality of pixel electrodes located at the side of the organic layer away from the base substrate. The plurality of vias include a plurality of first vias for connecting first electrodes of the transistors with the pixel electrodes; and the plurality of platform structures include a plurality of first platform structures, where the first via passes through the first platform structure.

In some embodiments, in the above display substrate provided in the embodiments of the disclosure, a part of the first platform structures are integrated with the respective support structures.

In some embodiments, in the above display substrate provided in the embodiments of the disclosure, a minimum distance between the first platform structure and the support structure is less than 2 μm.

In some embodiments, in the above display substrate provided in the embodiments of the disclosure, an aperture of the via gradually increases in a direction from the base substrate to the organic layer, and a minimum distance between a top port of the first via hole and the support structure is greater than or equal to 2 μm.

In some embodiments, the above display substrate provided in the embodiments of the disclosure further includes a plurality of first link parts for connecting the support structures with the first platform structures.

In some embodiments, the above display substrate provided in the embodiments of the disclosure further includes a common electrode between a layer where the plurality of pixel electrodes are located and the organic layer, and a plurality of transfer electrodes in a same layer and made of a same material as the first electrodes of the transistors. The plurality of vias further include a plurality of second vias for connecting the common electrode with the transfer electrodes; and the plurality of platform structures include a plurality of second platform structures, where the second via passes through the second platform structure.

In some embodiments, in the above display substrate provided in the embodiments of the disclosure, the second platform structures are integrated with a part of the first platform structures, and the second platform structures and the support structures are integrated with different first platform structures respectively.

In some embodiments, the above display substrate provided in the embodiments of the disclosure further includes a plurality of second link parts for connecting the second platform structures with the first platform structures.

In some embodiments, in the above display substrate provided in the embodiments of the disclosure, a thickness of the platform structure is substantially same as a thickness of the support structure in a direction from the base substrate to the organic layer.

In some embodiments, in the above display substrate provided in the embodiments of the disclosure, a surface of the organic layer away from the base substrate is uneven.

In some embodiments, the above display substrate provided in the embodiments of the disclosure further includes a plurality of gate lines between the organic layer and the base substrate and extending in a first direction and arranged in a second direction, where the first direction intersects the second direction. A size of the support structure gradually decreases in a direction from the base substrate to the organic layer, the support structure includes a top base away from the base substrate, and a width of the top base in the first direction is greater than or equal to 6 μm and less than or equal to 12 μm; and a length of the support structure in the second direction is greater than or equal to 25 μm and less than or equal to 50 μm.

In some embodiments, in the above display substrate provided in the embodiments of the disclosure, a slope angle of the support structure is greater than or equal to 30° and less than or equal to 60°.

In some embodiments, in the above display substrate provided in the embodiments of the disclosure, a thickness of the planarization layer in a direction from the base substrate to the organic layer is greater than 2 μm.

In some embodiments, in the above display substrate provided in the embodiments of the disclosure, a thickness of the platform structure in a direction from the base substrate to the organic layer is greater than or equal to 0.5 μm and less than or equal to 1.2 μm.

In another aspect, embodiments of the disclosure provide a manufacturing method for the above display substrate, including: providing the base substrate; and forming the organic layer on the base substrate by using a half-tone mask. Where the organic layer includes a planarization layer and a plurality of support structures, the planarization layer includes a plurality of vias, the support structures are disposed on a side of the planarization layer away from the base substrate and integrated with the planarization layer, and orthographic projections of the support structures on the base substrate do not overlap with orthographic projections of the vias on the base substrate.

In some embodiments, in the above manufacturing method provided in the embodiments of the disclosure, forming the organic layer on the base substrate by using the half-tone mask, specifically includes: forming the plurality of support structures, a first planarization portion blocked by the support structures, the plurality of platform structures, and a second planarization portion blocked by the platform structures by using an opaque area of the half-tone mask; forming a third planarization portion not blocked by the support structures and the platform structures by using a semi-transmissive area of the half-tone mask; and forming a plurality of vias passing through the platform structures and the second planarization portion by using a fully-transmissive area of the half-tone mask, where the planarization layer of the organic layer includes the first planarization portion, the second planarization portion, and the third planarization portion.

In some embodiments, in the above manufacturing method provided in the embodiments of the disclosure, a transmittance of the semi-transmissive area of the half-tone mask is greater than or equal to 15% and less than or equal to 35%.

In another aspect, embodiments of the disclosure further provide a display panel, including a display substrate and an opposing substrate opposite to each other, and a liquid crystal layer between the display substrate and the opposing substrate, where the display substrate is the above display substrate provided in the embodiments of the disclosure.

In some embodiments, in the above display panel provided in the embodiments of the disclosure, the opposing substrate includes a black matrix, and the orthographic projections of the platform structures on the base substrate is located in an orthogonal projection of the black matrix on the base substrate.

In another aspect, embodiments of the disclosure provide a display device, including a backlight module and a display panel located at a light emitting side of the backlight module, where the display panel is the above display panel provided in the embodiments of the disclosure.

BRIEF DESCRIPTION OF FIGURES

FIG. 24 is a flowchart of a manufacturing method for a display substrate according to embodiments of the disclosure.

5

Figure 1:
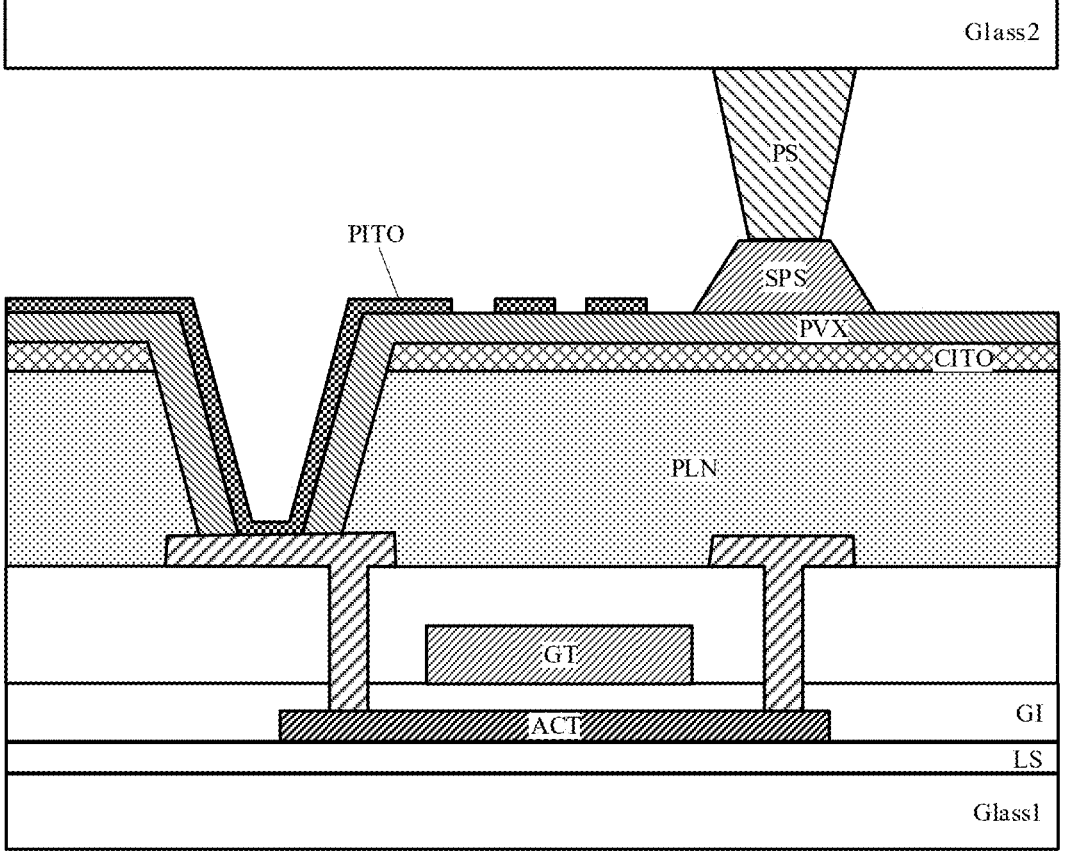
FIG. 1 is a schematic structural diagram of a display panel in the related art.

REFERENCE SIGNS base substrate—101, organic layer—102, planarization layer—1021, first planarization portion—10211, second planarization portion—10212, third planarization portion—10213, support structure—1022, platform structure—1023, first platform structure—10231, second platform structure—10232, transistor—103, first electrode—1031, second electrode—1032, gate electrode—1033, active layer—1034, common electrode—104, pixel electrode—105, transfer electrode—106, gate line—107, inorganic insulating layer—108, common electrode line—109, interlayer dielectric layer—110, gate insulating layer—111, data line—112, light blocking layer—113; display substrate—001, opposing substrate—002, liquid crystal layer—003, black matrix—201, substrate—202.

DETAILED DESCRIPTION

In order to make the purposes, technical solutions and advantages of the disclosure clearer, the technical solutions of the embodiments of the disclosure will be described clearly and completely below in combination with the accompanying drawings of the embodiments of the disclosure. It is necessary to note that the size and shape of each diagram in the accompanying drawings do not reflect the true proportion, and are merely for purpose of schematically illustrating the content of the disclosure. Also, the same or similar reference numbers represent the same or similar elements or the elements having the same or similar functions all the way. In order to keep the following description of the embodiments of the disclosure clear and concise, the disclosure omits the detailed description of known functions and known components.

Unless otherwise defined, the technical or scientific terms used here shall have the general meaning understood by those ordinary skilled in the art to which the disclosure belongs. The "first", "second" and similar words used in the specification and claims of the disclosure do not represent any order, number or importance, and are only used to distinguish different components. The word such as "include" or "contain" or the like means that the element or object appearing before this word encompasses the elements or objects and their equivalents listed after this word, without excluding other elements or objects. The words such as "inner", "outer", "up", "down" are only used to indicate the relative position relationship. When the absolute position of a described object changes, the relative position relationship may also change accordingly.

As LCD products enter into all aspects of people's lives, people pay more and more attention to the display effect of the LCD products, and have more and more stringent requirements. The refinement of the design and the manufacturing process are inescapable requirements. Here, medium and large-sized vehicle products, touch panel (such as TPC), monitor (MNT) and other products will have an impact on display effect due to changes in ambient temperature or being impacted by external forces. This is because the spacer (PS) located on the opposing substrate (such as color filter (CF)) in these products has poor effect, resulting in defects such as stripe (PS Mura) and light leakage due to shift in cell alignment between the display substrate (Array) and the opposing substrate. Also, when the strength of the liquid crystal panel is insufficient, there is a risk that the spacer (PS) slides into the via of the planarization (PLN) layer after being impacted by the external force, and the role of the spacer (PS) in maintaining the cell gap uniformity will be lost, resulting in irrecoverable stains, and causing poor stripes (PS Mura) defect.

By arranging a support structure (Smart PS, SPS) on the display substrate (Array) to achieve stable support for the spacer (PS), the above technical problems can be effectively improved, the product defects can be reduced, the quality and yield of liquid crystal display products can be increased, and the cost can be lowered. FIG. 1 shows a solution of using the support structure (Smart PS, SPS) to support the spacer (PS) in the related art. As can be seen from FIG. 1, in this solution, two organic layers need to be formed in the display substrate (Array), where one organic layer is a planarization layer (PLN) to planarize a lower film layer and prevent the lower film layer from forming parasitic capacitance with the common electrode (CITO) and pixel electrode (PITO); and the other organic layer is a film layer of the support structure (Smart PS, SPS), which can effectively prevent the spacer (PS) from sliding into the via of the planarization layer (PLN), so that the spacer (PS) can better play its role in maintaining the cell gap uniformity. However, one of the current bottlenecks is the exposure machine dedicated to the organic layer. The solution shown in FIG. 1 has caused the greater pressure on production capacity; and the thickness of the organic layer is relatively large, so the film thickness and dimensional (CD) stability are both poor. The coating, exposure and development processes of the two organic layers greatly reduce the process stability and have a negative impact on the uniformity of the support force of the spacer (PS), thus increasing risks such as stripes (PS Mura) and insufficient transmittance caused by the uneven stress on the spacer (PS).

In order to improve the above technical problems in the related technology, embodiments of the disclosure provide a display substrate, as shown in FIG. 2 to FIG. 13, including:

a base substrate 101, where the base substrate 101 is optionally a rigid substrate, such as a glass substrate; and an organic layer 102 disposed at a side of the base substrate 101 and including a planarization layer 1021 and a plurality of support structures 1022; where the planarization layer 1021 includes a plurality of vias h, the support structures 1022 are disposed on a side of the planarization layer 1021 away from the base substrate 101 and arranged integrally with the planarization layer 1021; orthographic projections of the support structures 1022 on the base substrate 101 do not overlap with orthographic projections of the vias h on the base substrate 101; and optionally, a material of the organic layer 102 may include at least one of polymethyl methacrylate (also known as acrylic), polyacrylic resin, polyepoxy acrylic resin, photosensitive polyimide resin, polyester acrylate, polyurethane acrylate resin, novolac epoxy resin and other organic insulating materials, and is not limited here.

In the above display substrate provided in the embodiments of the disclosure, the planarization layer 1021 can planarize the lower film layer, and prevent the parasitic capacitance between a conductive film layer (such as the source and drain metal layer of a transistor 103) under the planarization layer 1021 and a conductive film layer (such as the layer where the common electrode 104 is located) above the planarization layer 1021; the support structure 1022 can support the spacer (PS); the via h passing through the planarization layer 1021 can connect the pixel electrode 105 with a first electrode 1031 of the transistor 103, or make the electrical connection between the common electrode 104 and the transfer electrode 106. Since the support structures 1022 are located on the side of the planarization layer 1021 away from the base substrate 101, the orthographic projections of the support structures 1022 on the base substrate 101 do not overlap with the orthographic projections of the vias h on the base substrate 101, thereby avoiding the support structures 1022 from blocking the vias h, and ensuring that the support structures 1022 and the vias h can function normally.

Compared with the solution of using two organic layers 102 to form the planarization layer 1021 and the support structures 1022 separately in the related art, in the disclosure, by integrally arranging the support structures 1022 and the planarization layer 1021, that is, using one organic layer 102 to simultaneously form the planarization layer 1021 and the support structures 1022, can reduce the one patterning (Mask) process and the curing process of the organic layer 102, and thus reduces the production capacity pressure of the exposure machine while reducing the process fluctuation caused by two patterning (Mask) processes and two curing processes, improves the uniformity of the size (CD) and film thickness of the support structures 1022, makes the uniformity of the support force of the support structures 1022 on the spacer (PS) better, and ultimately improves the uniformity of the display quality.

In some embodiments, in the above display substrate provided in the embodiments of the disclosure, a Half-Tone Mask (HTM) may be used to form different graphics in different areas of the organic layer 102. For example, an opaque area (i.e., an area with the transmittance approximately equal to 0%) of the half-tone mask can be used to form the pattern of the area where the support structures 1022 are located, a fully-transmissive area (i.e., an area with the transmittance approximately equal to 100%) of the half-tone mask can be used to form the pattern of the area where the vias h are located, and a semi-transmissive area (i.e. an area with the transmittance greater than 0% and less than 100%) of the half-tone mask can be used to form the pattern of at least some areas of the planarization layer 1021 that is not blocked by the support structures 1022. In the disclosure, "approximately equal" may be understood to be the same or within a reasonable error range (for example, ±5%) caused by factors such as manufacturing and measurement.

Figure 10:
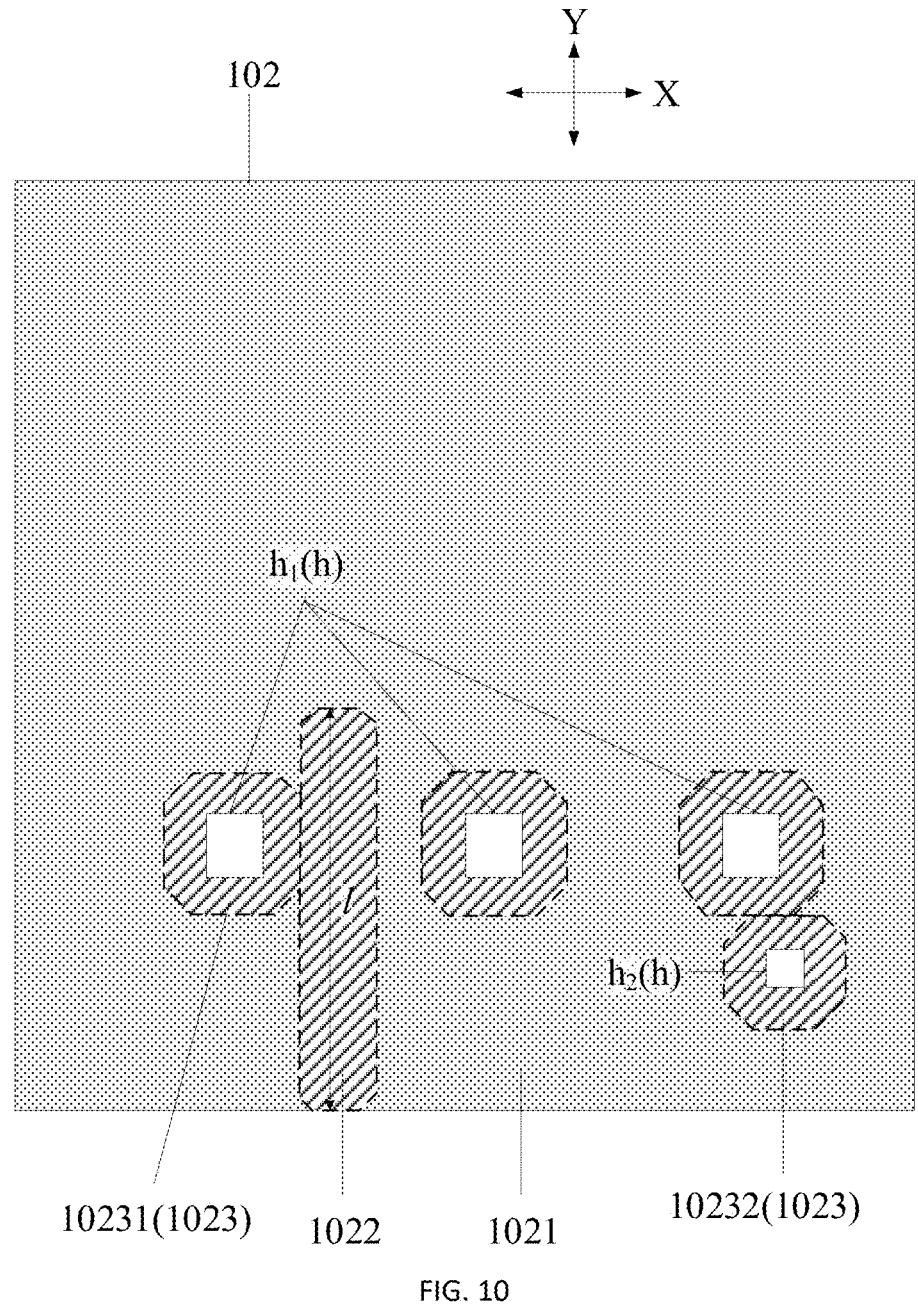
FIG. 10 is a schematic structural diagram of a planarization layer in FIG. 2.

However, the inventor(s) found that if a distance between the semi-transmissive area and the fully-transmissive area is too close, they will affect each other, so that the shapes of the vias h formed corresponding to the fully-transmissive area are poor, and the overexposure occurs in the semi-transmissive area and the planarization layer 1021 corresponding to the semi-transmissive area is uneven. In some embodiments, the mutual influence between the fully-transmissive area and the semi-transmissive area can be reduced by increasing the distance between the fully-transmissive area and the semi-transmissive area, thereby forming the vias h and planarization layer 1021 with better shapes. Based on this, as shown in FIG. 3, FIG. 4 and FIG. 10, a plurality of platform structures 1023 integrated with the planarization layer 1021 may be arranged on the side of the organic layer 102 away from the base substrate 101, and the vias h extend to pass through the platform structures 1021.

Figure 14:
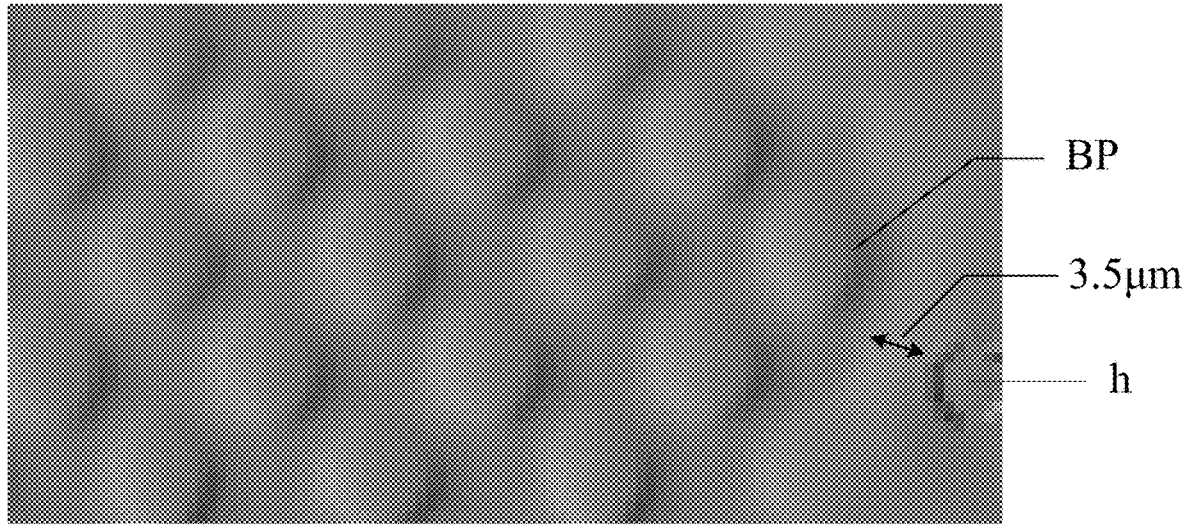
FIG. 14 is a picture showing diamond-shaped bosses and a via formed in an organic layer using the half-tone mask.
Figure 15:
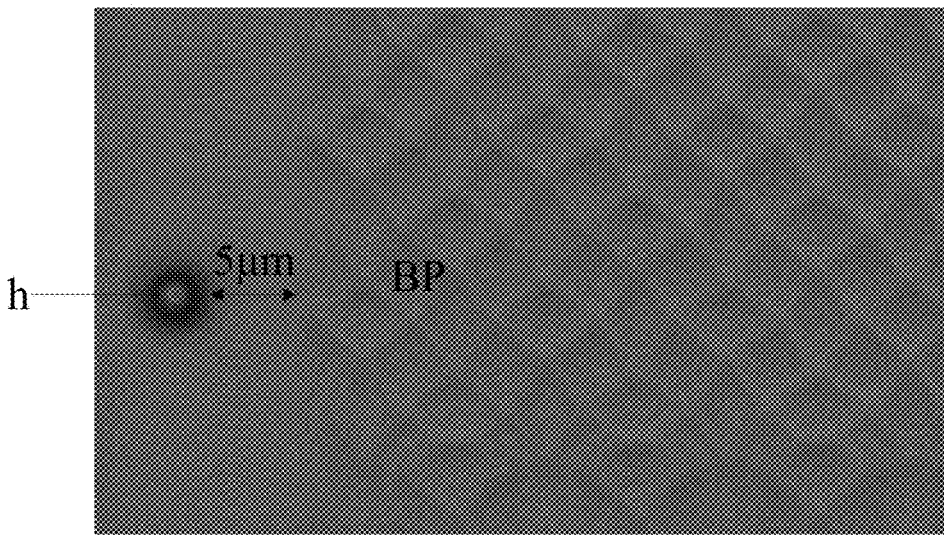
FIG. 15 is another picture showing the diamond-shaped bosses and the via formed in the organic layer using the half-tone mask.

FIGS. 14 and 15 respectively show pictures of the diamond-shaped bosses BP and vias h formed in the organic layer using the half-tone mask, where FIG. 14 is a picture showing the diamond-shaped bosses BP and vias h formed in the organic layer using the half-tone mask in which the distance between the fully-transmissive area and the semi-transmissive area is 3.5 μm, and FIG. 15 is a picture showing the diamond-shaped bosses BP and vias h formed in the organic layer using the half-tone mask in which the distance between the fully-transmissive area and the semi-transmissive area is 5 μm. As can be seen from the comparison of FIG. 14 and FIG. 15, when the distance between the fully-transmissive area and the semi-transmissive area is 3.5 μm, the vias h formed corresponding to the fully-transmissive area have edge burrs and are in poor topographical morphology, and the slope angles of the diamond-shaped bosses BP formed corresponding to the opaque area are not good with no obvious rhombus formed; when the distance between the fully-transmissive area and the semi-transmissive area is 5 μm, the vias h formed corresponding to the fully-transmissive area are in good topographical morphology, and the diamond-shaped bosses BP formed corresponding to the opaque area show the complete rhombus shape.

As can be seen from the above, when the distance between the fully-transmissive area and the semi-transmissive area is more than 5 μm, the mutual influence between them is very small. Therefore, in the above display substrate provided in the embodiments of the disclosure, as shown in FIGS. 3 and 4, a minimum distance $s_1$ between an outer surface of the platform structure 1023 away from the via h and the via h may be greater than or equal to 5 μm. Optionally, when the actual product has large resolution and small pixel size, the minimum distance $s_1$ between the outer surface of the platform structure 1023 away from the via h and the via h can be set to be equal to 5 μm; when the actual product has small resolution and large pixel size, the minimum distance $s_1$ between the outer surface of the platform structure 1023 away from the via h and the via h can be set to be greater than 5 μm and less than the pixel size. In some embodiments, the mutual influence between the fully-transmissive area and the semi-transmissive area can further be reduced by using a low-sensitivity organic material in cooperation with an exposure machine with higher precision. In the future, it is expected that the transition area between the fully-transmissive area and the semi-transmissive area can be cancelled.

Figures 3, 4:
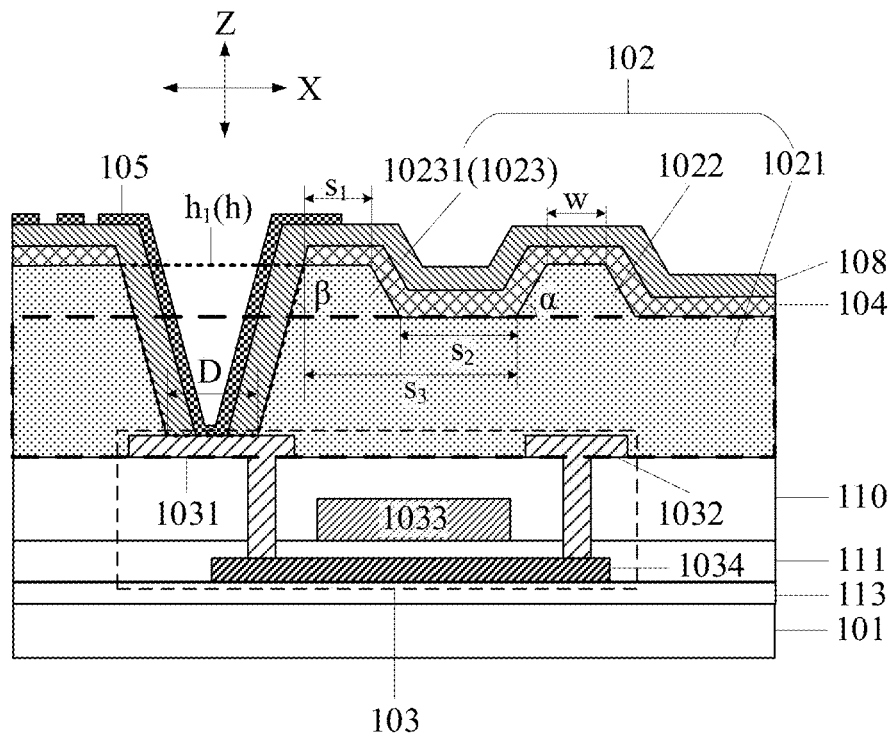
FIG. 3 is a cross-sectional view along line I-I' in FIG. 2.
FIG. 4 is a cross-sectional view along line II-II' in FIG. 2.

Continuing to refer to FIGS. 3 and 4, the via h is a via with an aperture gradually increasing in the direction Z from the base substrate 101 to the organic layer 102, and the platform structure 1023 is a platform structure with a size gradually decreasing in the direction Z from the base substrate 101 to the organic layer 102. In the disclosure, the minimum distance $s_1$ between the outer surface of the platform structure 1023 away from the via h and the via h can be understood as a distance between a top end with the largest aperture in the via h and the outer surface of the top with the smallest size in the platform structure 1023.

The half-tone mask includes three areas: fully-transmissive area, semi-transmissive area and opaque area, so the area between the fully-transmissive area and the semi-transmissive area is the opaque area. Based on this, in the above display substrate provided in the embodiments of the disclosure, the platform structures 1023 may be formed using the opaque area. In addition, the support structures 1022 protruding from the planarization layer 1021 are also formed using the opaque area in the disclosure. In the direction Z from the base substrate 101 to the organic layer 102, the platform structure 1023 and the support structure 1022, both formed by the opaque area, may have approximately the same thickness. In the disclosure, "substantially the same" may be understood to be the same or within a reasonable error range (for example, ±5%) caused by factors such as manufacturing and measurement.

In some embodiments, in the above display substrate provided in the embodiments of the disclosure, the thickness of the platform structure 1023 in the direction Z from the base substrate 101 to the organic layer 102 may be greater than or equal to 0.5 μm and less than or equal to 1.2 μm. For example, the thickness of the platform structure 1023 may be 0.5 μm, 0.6 am, 0.7 μm, 0.8 μm, 0.9 μm, 1 μm, 1.1 μm, 1.2 μm, etc. The larger the thickness of the platform structure 1023, the more stable the shape of the formed support structure 102 and the better the protection effect for the via h. However, the platform structure 1023 with larger thickness will increase the difficulty of the process. Therefore, the thickness of the platform structure 1023 is set to be between 0.5 μm and 1.2 μm in the disclosure in the case of comprehensive consideration of the support effect and production process. Since the thickness of the platform structure 1023 is approximately the same as the thickness of the support structure 1022, the thickness of the support structure 1022 can also be between 0.5 μm and 1.2 μm. The support structure 1022 within this thickness range can stably support the spacer (PS).

It should be noted that the higher the transmittance of the semi-transmissive area, the higher the step difference (equivalent to the thickness of the support structure 1022) formed between the support structure 1022 formed by the opaque area and the planarization layer 1021 blocked thereby, and the planarization layer 1021 formed by the semi-transmissive area under illumination of the same dose. However, if the transmittance of the semi-transmissive area is too small, in order to achieve the corresponding step difference (equivalent to the thickness of the support structure 1022), the illumination of larger dose is required. The illumination of large dose easily makes the via h formed by the fully-transmissive area too large. On the contrary, if the transmittance of the semi-transmissive area is too large, in order to achieve the required step difference (equivalent to the thickness of the support structure 1022), the illumination of very small dose is required. The illumination of small dose easily makes the via h formed by the fully-transmissive area too small, and the via h that completely passing through the organic layer 102 may not even be formed. Therefore, in order to ensure that the size of the via h is appropriate while satisfying the corresponding step difference (equivalent to the thickness of the support structure 1022), the transmittance of the semi-transmissive area may be set to be greater than or equal to 15% and less than or equal to 35% in the disclosure. For example, the transmittance of the semi-transmissive area is 15%, 20%, 25%, 30%, 35%, etc.

In some embodiments, the above display substrate provided in the embodiments of the disclosure, as shown in FIGS. 2 to 4, 7 and 16, further includes a plurality of gate lines 107 between the organic layer 102 and the base substrate 101 and extending in a first direction X and arranged in a second direction Y, where the first direction X intersects the second direction Y. The size of the support structure 1022 gradually decreases in the direction Z from the base substrate 101 to the organic layer 102, The support structure 1022 includes a top base away from the base substrate 101, and a width w of the top base in the first direction X is greater than or equal to 6 μm and less than or equal to 12 μm. For example, the width w of the top base of the support structure 1022 is 6 μm, 7 μm, 8 μm, 9 μm, 10 μm, 11 μm, 12 μm, etc. The minimum requirement for the top width w of the support structure 1022 is 6 μm in order to better match the spacer (PS) and meet the minimum requirement of support force. In order to support the spacer (PS) more stably, the top width w of the support structure 1022 can be made larger (for example, 12 μm). However, taking into account the pixel transmittance (also called pixel aperture ratio) and the design limitations of the pattern of the support structure 1022, the top width w of the support structure 1022 in the disclosure should not be too large. Optionally, the top width w of the support structure 1022 is 10 μm, which can better meet the support force requirement and avoid affecting the pixel transmittance.

In some embodiments, in the above display substrate provided in the embodiments of the disclosure, in order to prevent a lapping defect between the support structure 1022 and the spacer (PS) to ensure that the support structure 1022 stably supports the spacer (PS), as shown in FIG. 10, the length I of the support structure 1022 in the second direction Y may be set to be greater than or equal to 25 μm and less than or equal to 50 μm. For example, the length I of the support structure 1022 in the second direction Y is 25 μm, 30 μm, 35 μm, 40 μm, 45 μm, 50 μm, etc.

Figure 16:
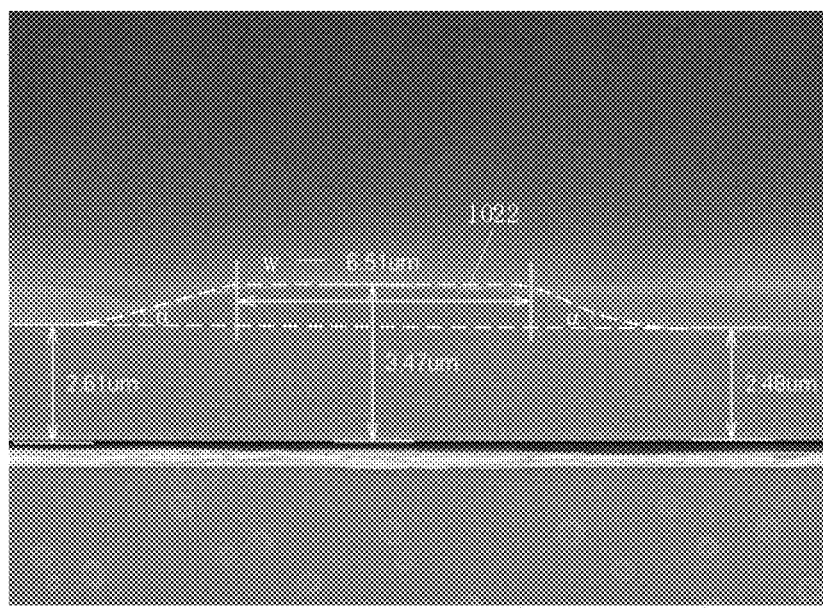
FIG. 16 is a partial view of the organic layer according to embodiments of the disclosure.

In some embodiments, in the above display substrate provided in embodiments of the disclosure, as shown in FIGS. 3, 4 and 16, a slope angle α of the support structure 1022 is greater than or equal to 30° and less than or equal to 60°. For example, the slope angle α of the support structure 1022 is 30°, 35°, 40°, 45°, 50°, 55°, 60°, etc., to make the side slope of the support structure 1022 gentler, and ensure that the films of the subsequently-manufactured common electrode 104, inorganic insulating layer 108 and pixel electrode 105 at the support structures 1022 have no crack defect or peeling risk. As shown in FIG. 16, the top width w of the support structure 1022 is about 6.5 μm, the bottom width of the support structure 1022 is about 8 μm, the thickness of the support structure 1022 is about 1 μm, and the slope angle α of the support structure 1022 is about 35°, so as to ensure that the films of the subsequently-manufactured common electrode 104, inorganic insulating layer 108 and pixel electrode 105 at the support structures 1022 are fine without defects.

Figure 17:
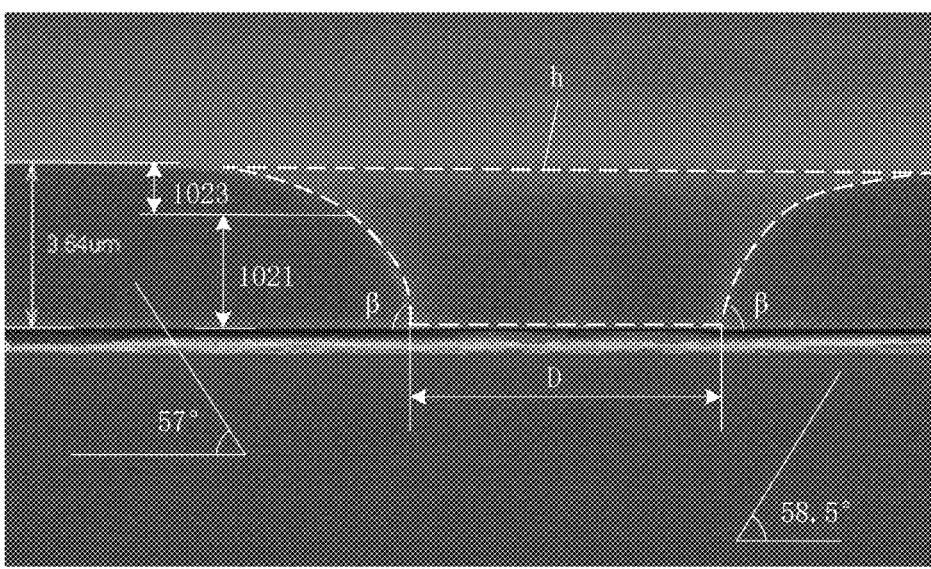
FIG. 17 is another partial view of the organic layer according to embodiments of the disclosure.

In some embodiments, in the above display substrate provided in the embodiments of the disclosure, as shown in FIGS. 3, 4 and 17, a slope angle β of the planarization layer 1021 at the via h is greater than or equal to 50° and less than or equal to 60°. For example, the slope angle β of the planarization layer 1021 at the via h is 50°, 51°, 52°, 53°, 54°, 55°, 56°, 57°, 58°, 59°, 60°, etc. The slope angle β of the planarization layer 1021 at the via h within this angle range allows not only the aperture of the top port of the via h to be smaller to ensure the process margin between the via h and the relevant film layer, but also ensure the good lapping of the pixel electrode 105 or the common electrode 104 in the via h. It can be seen from FIG. 17 that the slope angle β of the planarization layer 1021 at the via h is about 55° and is protected by the platform structure 1023, and the topographical morphology of the via h is better.

In some embodiments, in the above display substrate provided in the embodiments of the disclosure, as shown in FIGS. 3, 4 and 17, the aperture of the via h gradually increases in the direction Z from the base substrate 101 to the organic layer 102. The via h includes a bottom end close to the base substrate 101, and the aperture D of the bottom end is greater than or equal to 4 μm and less than or equal to 7 μm. For example, the aperture D of the bottom end of the via h is 4 μm, 5 μm, 6 μm, 7 μm, etc. In some cases where the slope angle β of the planarization layer 1021 at the via h is greater than or equal to 50° and less than or equal to 60°, in order to form the via h with a good topographical morphology, it is necessary to ensure that the bottom end of the via h is smaller than the top end of the via h on one side by 1.4 µm-2 µm, such as about 1.7 µm, which means 3.4 µm on both sides. Therefore, it is necessary to ensure that the aperture D of the bottom end of the via h is greater than 4 µm. In the disclosure, the aperture D of the bottom end of the via h is set to be greater than or equal to 4 µm and less than or equal to 7 µm, to ensure that the topographical morphology of the via h is better, as shown in FIG. 17.

In some embodiments, in the above display substrate provided in the embodiments of the disclosure, the thickness of the planarization layer 1021 in the direction Z from the substrate 101 to the organic layer 102 may be greater than 2 µm. For example, the thickness of the planarization layer 1021 in the direction Z from the substrate 101 to the organic layer 102 is about 2.5 µm, so that the planarization layer 1021 can well serve to planarize the lower film layer, and prevent the parasitic capacitance between the conductive film layer (such as the source and drain metal layer of the transistor 103) under the planarization layer 1021 and the conductive film layer (such as the layer where the common electrode 104 is located) above the planarization layer 1021.

In some embodiments, in the above display substrate provided in the embodiments of the disclosure, the surface of the organic layer 102 away from the base substrate 101 may be uneven, that is, the surface of the organic layer 102 away from the base substrate 101 is relatively rough, so as to increase the contact area between the organic layer 102 and the common electrode 104, and thus improve the adhesion between the organic layer 102 and the common electrode 104, and prevent the film layer where the common electrode 104 is located from suffering from peeling defect. Optionally, the surface of the organic layer 102 away from the base substrate 101 becomes uneven by performing ion bombardment (Descum) on the surface of the organic layer 102 away from the base substrate 101.

Figure 2:
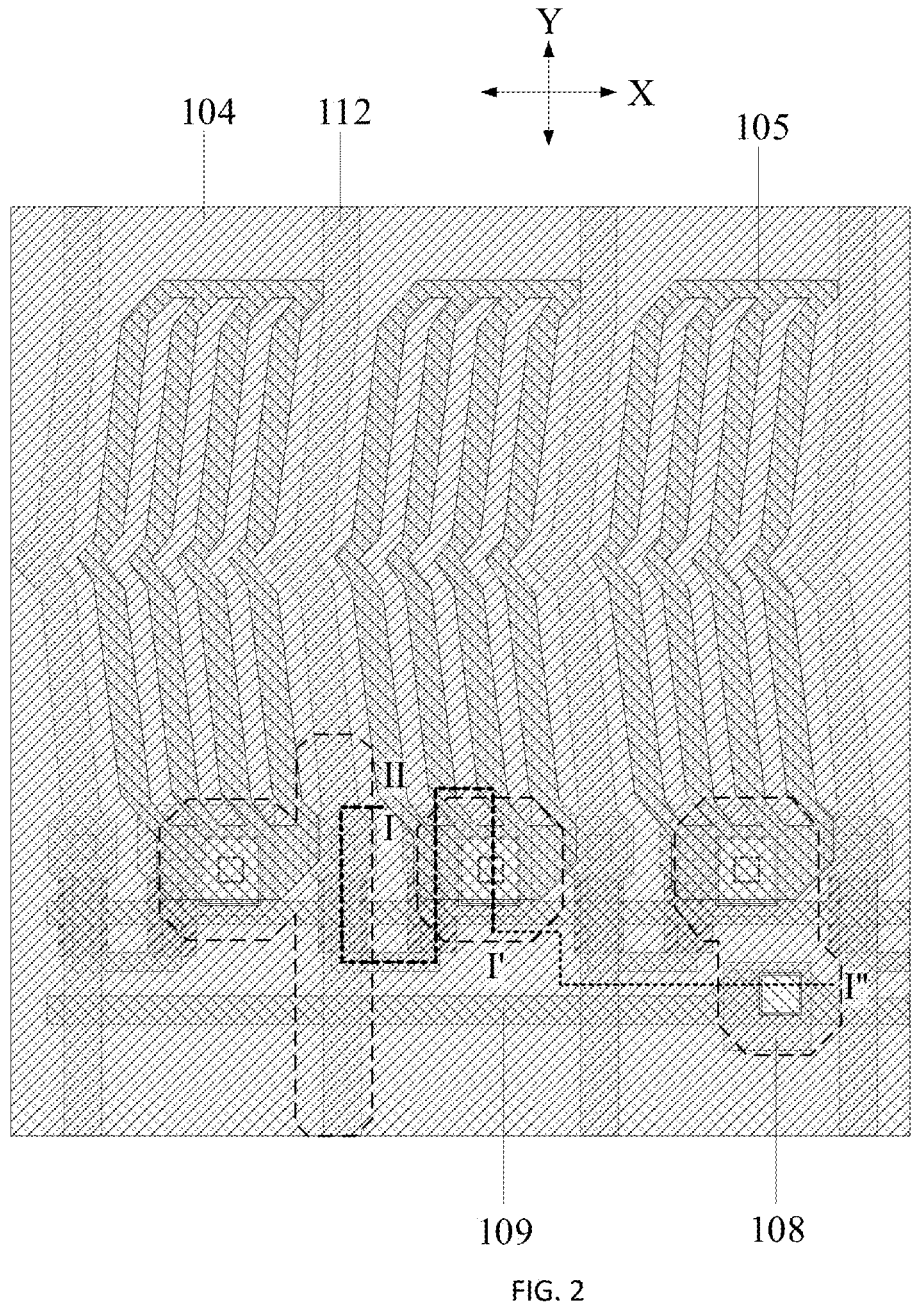
FIG. 2 is a schematic structural diagram of a display substrate according to embodiments of the disclosure.
Figure 18:
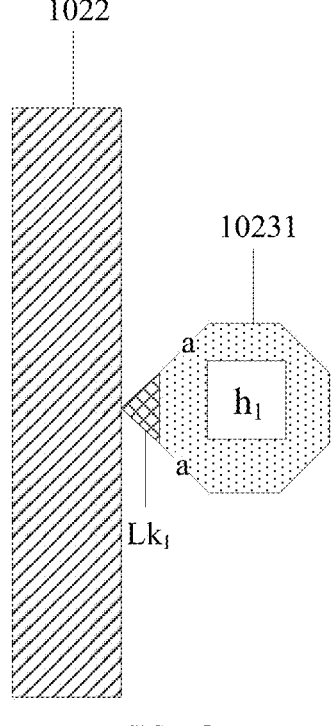
FIG. 18 is a schematic diagram illustrating a connection between a support structure and a first platform structure according to embodiments of the disclosure.
Figure 20:
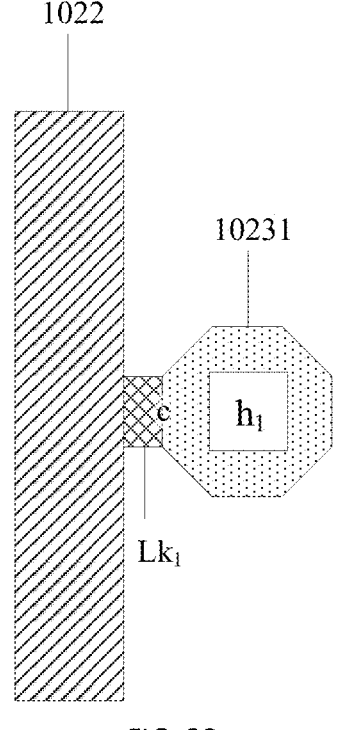
FIG. 20 is yet another schematic diagram illustrating a connection between a support structure and a first platform structure according to embodiment of the disclosure.

In some embodiments, in the above display substrate provided in the embodiments of the disclosure, as shown in FIGS. 2, 3 and 10, a plurality of transistors 103 are located between the organic layer 102 and the base substrate 101, and a plurality of pixel electrodes 105 are located at a side of the organic layer 102 away from the base substrate 101. The plurality of vias h include a plurality of first vias $h_1$ that connect the first electrodes 1031 of the transistors 103 with the pixel electrodes 105. The plurality of platform structures 1023 include a plurality of first platform structures 10231 that are penetrated by the first vias $h_1$, so as to form the first vias $h_1$ with better topographical morphology under the protection of the first platform structures 10231. Optionally, as shown in FIGS. 10, 18 and 20, some of the first platform structures 10231 are integrated with the respective support structures 1022. Since the first via $h_1$ has a certain slope, the support structure 1022 will lose the supporting function if the support structure 1022 falls on the slope of the first via $h_1$. Therefore, in some embodiments, the top end of the first via $h_1$ is larger than the bottom end thereof by approximately 1 µm on one side. In order to ensure the process margin, a minimum distance s3 between the top end of the first via $h_1$ and the bottom base of the support structure 1022 should be greater than or equal to 2 µm. Also, considering that the first platform structure 10231 is arranged around the first via $h_1$, in the disclosure, if a minimum distance $s_2$ between the first platform structure 10231 and the support structure 1022 (since both the first platform structure 10231 and the support structure 1022 are platforms with sizes gradually decreasing in the direction Z from the base substrate 101 to the organic layer 102, the minimum distance $s_2$ between the first platform structure 10231 and the support structure 1022 can be understood as a distance between the bottom base of the first platform structure 10231 and the bottom base of the support structure 1022) is very small (for example, less than 2 µm), then the first platform structure 10231 and the support structure 1022 can be connected so that the first platform structure 10231 and the support structure 1022 are integrated into one. This arrangement can further prevent a very small semi-transmissive area from being sandwiched between the opaque area for forming the first platform structure 10231 and the opaque area for forming the support structure 1022 to result in the abnormal topographical morphology of the planarization layer 1021 formed corresponding to this semi-transmissive area.

Of course, whether to integrate the first platform structure 10231 and the support structure 1022 into one may be determined based on the actual pixel design in some embodiments. When the distance between the fully-transmissive area for forming the first via $h_1$ and the semi-transmissive area for forming the planarization layer 1021 (may be equivalent to the minimum distance $s_1$ between the outer distance of the first platform structure 10231 away from the first via $h_1$ and the first via $h_1$) is greater than 5 µm, the arrangement of the first platform structure 10231 can satisfy the condition that the minimum distance s3 between the top end of the first via $h_1$ and the support structure 1022 (the first via $h_1$ is a via with an aperture gradually increasing in the direction Z from the base substrate 101 to the organic layer 102, and the support structure 1022 is a platform with size gradually decreasing in the direction Z from the base substrate 101 to the organic layer 102, so the minimum distance s3 between the top end of the first via $h_1$ and the support structure 1022 can be understood as the distance between the top end of the first via $h_1$ and the bottom base of the support structure 1022) is greater than or equal to 2 µm, so whether to integrate the first platform structure 10231 and the support structure 1022 into one can be determined based on the actual pixel design without problems in design and process. Under the condition that the fully-transmissive area and the semi-transmissive area do not affect each other, whether to integrate the first platform structure 10231 and the support structure 1022 into one is within the scope of the disclosure.

Figure 19:
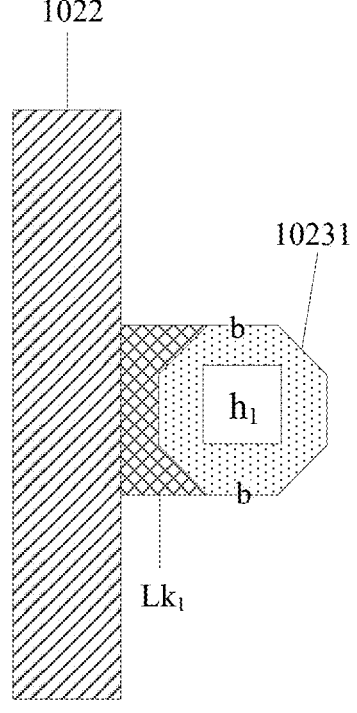
FIG. 19 is another schematic diagram illustrating a connection between a support structure and a platform structure according to embodiments of the disclosure.

The support structure 1022 and the first platform structure 10231 can be provided separately. Or, in some embodiments, for the support structure 1022 and the first platform structure 10231 that are provided integrally, as shown in FIG. 10, the first platform structure 10231 and the support structure 1022 may be directly connected; or, as shown in FIGS. 18 to 20, the first platform structure 10231 and the support structure 1022 may be connected through a first link part $Lk_1$. Optionally, as shown in FIG. 18, the sides a of the first platform structure 10231 can be directly extended to contact with the support structure 1022, to form the first link part $Lk_1$; or, as shown in FIG. 19, the sides b of the first platform structure 10231 can be directly extended to contact with the support structure 1022, to form the first link part $Lk_1$; or, as shown in FIG. 20, the two vertices of the side c of the first platform structure 10231 can be directly connected to the support structure 1022, to form the first link part $Lk_1$. Considering that the first link part $Lk_1$ shown in FIG. 18 has a sharp corner, the liquid crystal may have alignment and flow problems here. The width of the first link part $Lk_1$ shown in FIG. 20 is relatively small. Thus, in order to avoid affecting the alignment and flow of the liquid crystal and ensure the process stability, the first link part $Lk_1$ shown in FIG. 19 can be used during specific implementation. It should be noted that FIGS. 10, 18 to 20 all take the first platform structure 10231 as an octagonal platform as an example for illustration. In the disclosure, the first platform structure 10231 can be a polygonal platform such as a quadrilateral platform, a hexagonal platform, etc. In some embodiments, due to factors such as exposure accuracy, the corners of the first platform structure 10231, the support structure 1022 and the first link part $Lk_1$ may not be sharp but may be rounded corners, so the first platform structure 10231, the support structure 1022 and the first link part $Lk_1$ may also include arc segments.

In some embodiments, in the above display substrate provided in the embodiments of the disclosure, as shown in FIGS. 2, 4, 9 and 10, the common electrode 104 is located between the layer where the plurality of pixel electrodes 105 are located and the organic layer 102, and the transfer electrodes 106 may be arranged in the same layer and made of the same material as the first electrodes 1031 of the transistors 103. The plurality of vias h further include a plurality of second vias $h_2$ that connect the common electrode 104 with the transfer electrodes 106. The plurality of platform structures 1023 include a plurality of second platform structures 10232 that are penetrated by the second vias $h_2$, so as to form the second vias $h_2$ with better topographical morphology under the protection of the second platform structures 10232. Optionally, the second platform structures 10232 are provided integrally with some of the first platform structures 10231, and the second platform structures 10232 and the support structures 1022 are provided integrally with different first platform structures 10231 respectively. Optionally, there is an independent first platform structure 10231 between the first platform structure 10231 integrated with the platform structure 10232 and the first platform structure 10231 integrated with the support structure 1022. In the disclosure, if the distance between the first platform structure 10231 and the second platform structure 10232 is very small (for example, less than 2 μm), the first platform structure 10231 and the second platform structure 10232 can be connected, so that the first platform structure 10231 and the second platform structure 10232 are integrated into one, thereby preventing a very small semi-transmissive area from being sandwiched between the opaque area for forming the first platform structure 10231 and the opaque area for forming the second platform structure 10232 to result in the abnormal topographical morphology of the planarization layer 1021 formed corresponding to this semi-transmissive area.

Figure 21:
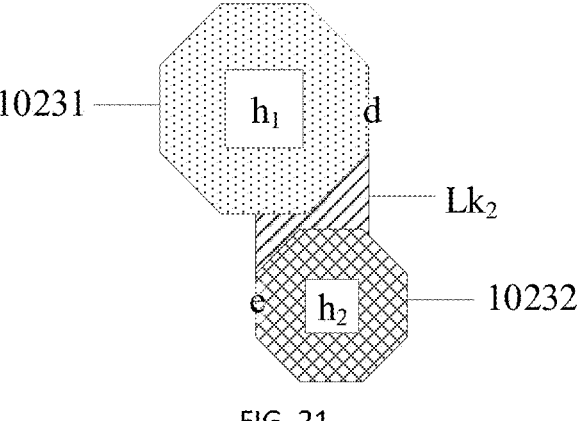
FIG. 21 is a schematic diagram illustrating a connection between a first platform structure and a second platform structure according to embodiments of the disclosure.
Figures 22, 23:
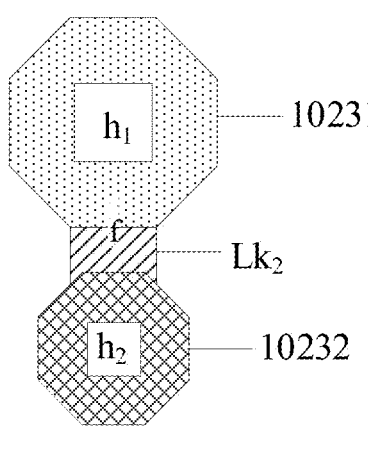
FIG. 22 is another schematic diagram illustrating a connection between the first platform structure and the second platform structure according to embodiments of the disclosure.
FIG. 23 is yet another schematic diagram illustrating a connection between the first platform structure and the second platform structure according to embodiments of the disclosure.

The first platform structure 10231 and the second platform structure 10232 can be provided separately. Or, in some embodiments, for the first platform structure 10231 and the second platform structure 10232 that are provided integrally, as shown in FIG. 10, the second platform structure 10232 and the first platform structure 10231 may be directly connected; or, as shown in FIGS. 21 to 23, the first platform structure 10231 has a certain distance from the second platform structure 10232 in the first direction and/or the second direction. The second platform structure 10232 and the first platform structure 10231 may be connected through the second link part $Lk_2$. Optionally, as shown in FIG. 21, the first platform structure 10231 and the second platform structure 10232 have a certain distance in both the first direction and the second direction. Optionally, the centers of the first via $h_1$ and the second via $h_2$ that penetrate the first platform structure 10231 and the second platform structure 10232 respectively can be staggered in the first direction and the second direction, the side d of the first platform structure 10231 can be directly extended to contact with the second platform structure 10232, and the side e of the second platform structure 10232 can be directly extended to contact with the first platform structure 10231, to form the second link part $Lk_2$; or, the connecting line of the centers of the first via $h_1$ and the second via $h_2$ that penetrate the first platform structure 10231 and the second platform structure 10232 respectively is along the first/second direction or the third direction, where the third direction is different from the first direction and the second direction. As shown in FIG. 22, the two vertices of the side f of the first platform structure 10231 can be directly connected with the second platform structure 10232 to form the second link part $Lk_2$; or, as shown in FIG. 23, the two vertices of the side g of the second platform structure 10232 can be directly connected to the first platform structure 10231 to form the second link part $Lk_2$. It should be noted that FIGS. 10, 21 to 23 all take the second platform structure 10232 as an octagonal platform as an example for illustration. In the disclosure, the second platform structure 10232 can also be a polygonal platform such as a quadrilateral platform, a hexagonal platform, etc. In some embodiments, due to factors such as exposure accuracy, the corners of the second platform structure 10232 may not be so sharp but may be rounded corners, so the second platform structure 10232 may also include arc segments.

It should be noted that the "same layer and same material" in the disclosure refers to using the same film-forming process to form a film layer for making a specific pattern, and then using the same mask to form a layer structure through a single patterning process. That is, one patterning process corresponds to one mask (also called photomask). According to different specific patterns, one patterning process may include multiple exposure, development or etching processes, and the specific patterns in the formed layer structure may be continuous or discontinuous. These specific patterns may be at the same height or have the same thickness, or may be at different heights or have different thicknesses.

In some embodiments, the above display substrate provided in the embodiments of the disclosure, as shown in FIG. 4 and FIG. 7 to FIG. 9, may further include a common electrode line 109 in the same layer and made of the same material as the gate line 107, where the common electrode line 109 is electrically connected with the transfer electrode 106 through the third via $h_3$ passing through the interlayer dielectric layer 110, and then provides a signal to the common electrode 104 through the transfer electrode 106. The existence of the common electrode line 109 can also effectively reduce the overall resistance of the common electrode 104, and is beneficial to maintaining the signal uniformity on the common electrode 104.

In some embodiments, in the above display substrate provided in the embodiments of the disclosure, as shown in FIGS. 3 and 4, the transistor 103 may include a second electrode 1032, a gate electrode 1033 and an active layer 1034 in addition to the first electrode 1031. The first electrode 1031 may be a source electrode and the second electrode 1032 may be a drain electrode, or the first electrode 1031 may be a drain electrode and the second electrode 1032 may be a source electrode. The materials of the first electrode 1031, the second electrode 1032 and the gate electrode 1033 may include metal materials or alloy materials, such as single-layer or multi-layer metal structure formed of molybdenum, aluminum, titanium, etc. For example, the multi-layer structure is a multi-metal stacked layer (such as three-metal stacked layer of titanium, aluminum and titanium (Ti/Al/Ti). The material of the active layer 1034 may include amorphous silicon, polycrystalline silicon, or oxide semiconductor (e.g., indium zinc oxide).

Optionally, the transistor 103 may be a bottom-gate transistor, a top-gate transistor, a dual-gate transistor, etc. In some embodiments, the transistor 103 may be a P-type transistor or an N-type transistor, where the P-type transistor is turned on when the voltage difference $V_{gs}$ between its gate electrode and source electrode and its threshold voltage $V_t$h satisfy the relationship $V_{gs} < V_{th}$, and is turned off when the voltage difference $V_{gs}$ between its gate electrode and source electrode and its threshold voltage $V_{th}$ satisfy the relationship $V_{gs} \geq V_{th}$; and the N-type transistor is turned on when the voltage difference $V_{gs}$ between its gate electrode and source electrode and its threshold voltage $V_{th}$ satisfy the relationship $V_{gs} > V_{th}$, and is turned off when the voltage difference $V_{gs}$ between its gate electrode and source electrode and its threshold voltage $V_{th}$ satisfy the relationship $V_{gs} \leq V_{th}$.

Referring to FIGS. 3, 4, 8 and 9, the first electrode 1031 can be electrically connected with the active layer 1034 through the fourth via $h_4$ that passes through the interlayer dielectric layer 110 and the gate insulating layer 111, and the second electrode 1032 can be electrically connected with the active layer 1034 through the fifth via $h_5$ that passes through the interlayer dielectric layer 110 and the gate insulating layer 111. In a specific implementation, after the material of the interlayer dielectric layer 110 and the material of the gate insulating layer 111 are coated, the fourth via $h_4$ and the fifth via $h_5$ that passes through the interlayer dielectric layer 110 and the gate insulating layer 111 may be simultaneously formed using one patterning process, to avoid patterning the interlayer dielectric layer 110 and the gate insulating layer 111 respectively to form the vias.

Figure 6:
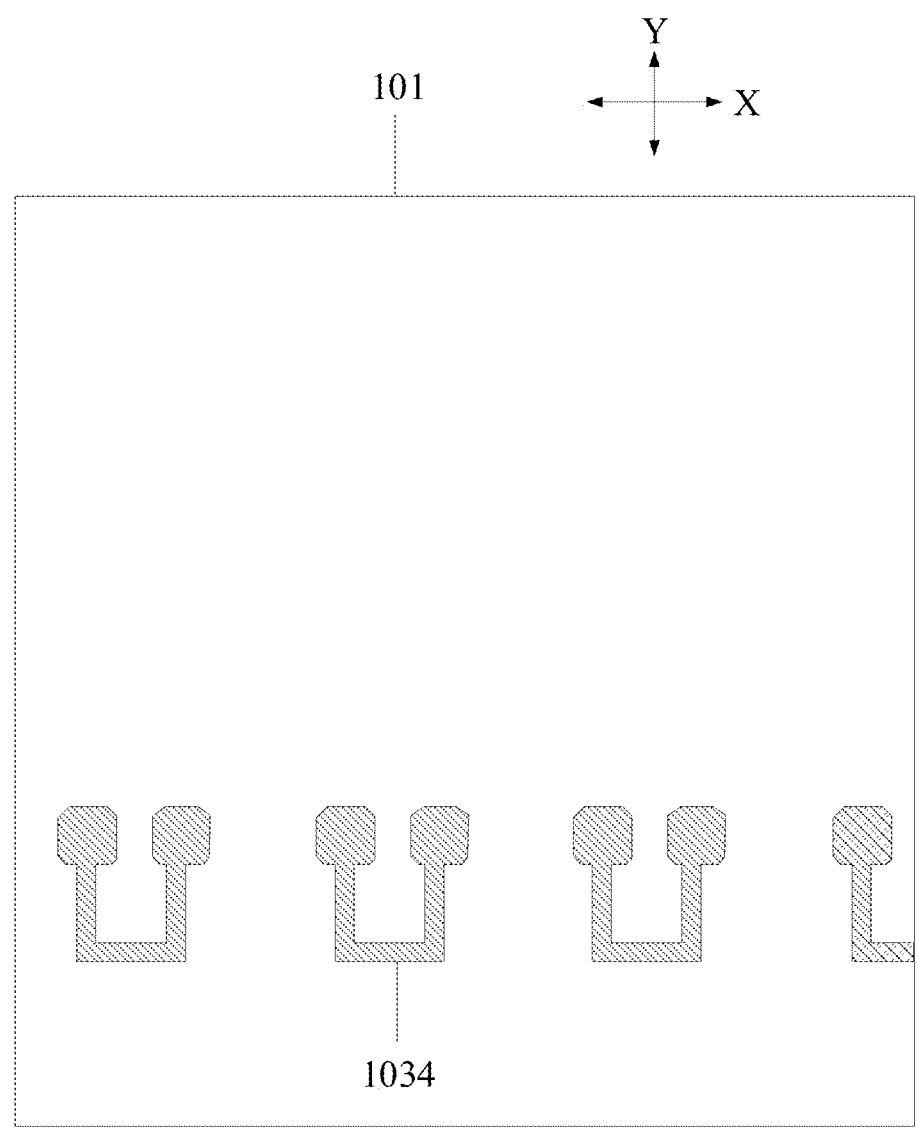
FIG. 6 is a schematic structural diagram of the active layer in FIG. 2.
Figure 7:
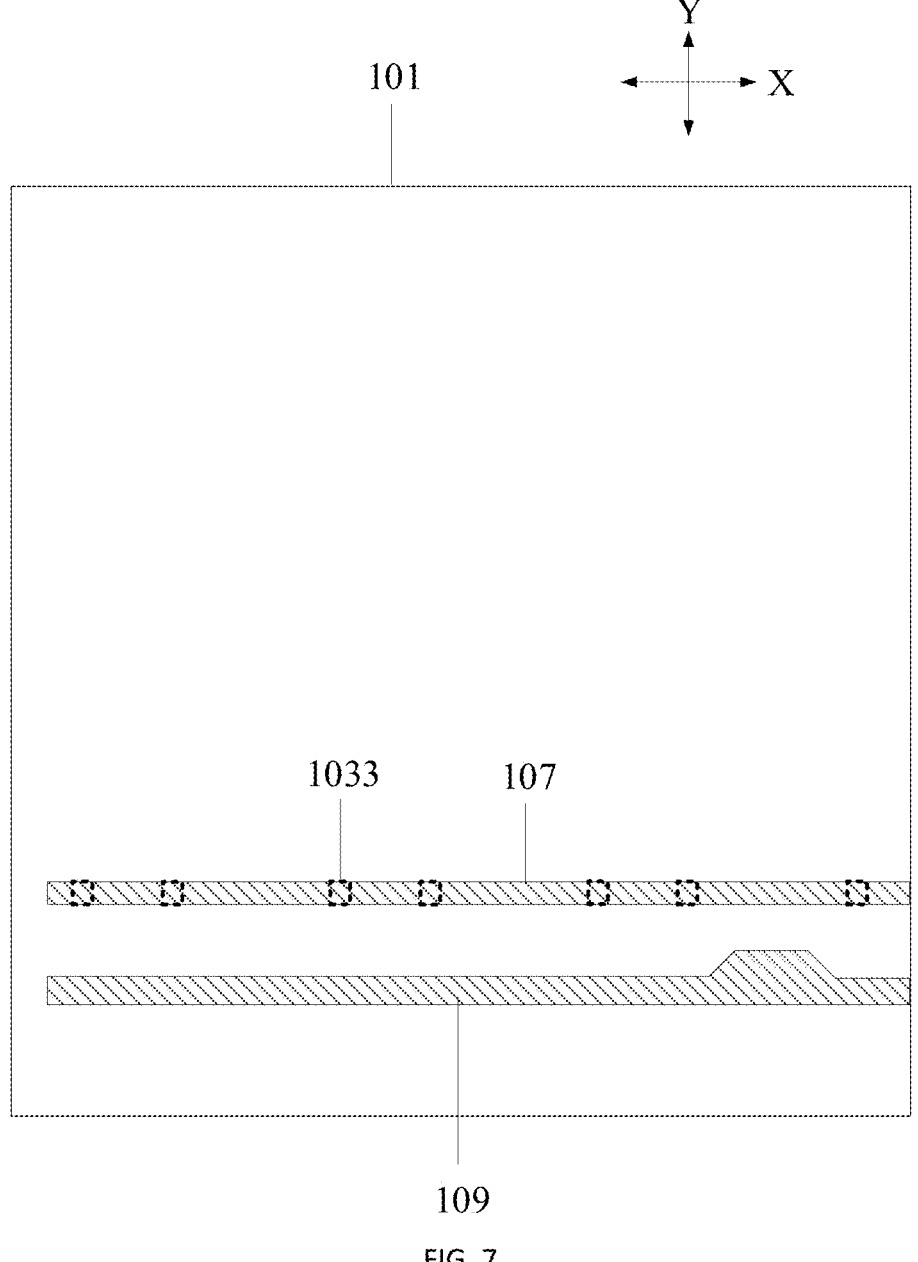
FIG. 7 is a schematic structural diagram of a layer where gate lines are located in FIG. 2.
Figure 8:
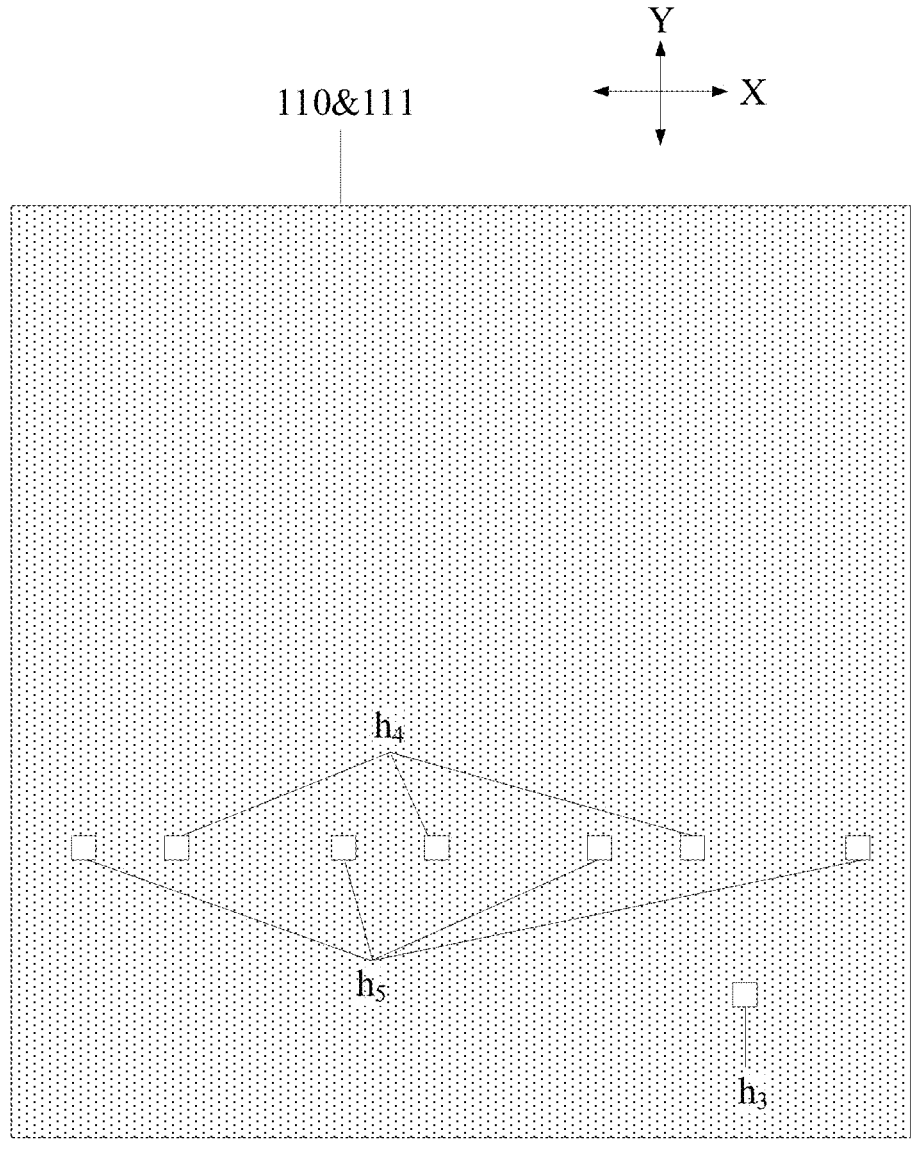
FIG. 8 is a schematic structural diagram of an interlayer dielectric layer and a gate insulating layer in FIG. 2.
Figure 9:
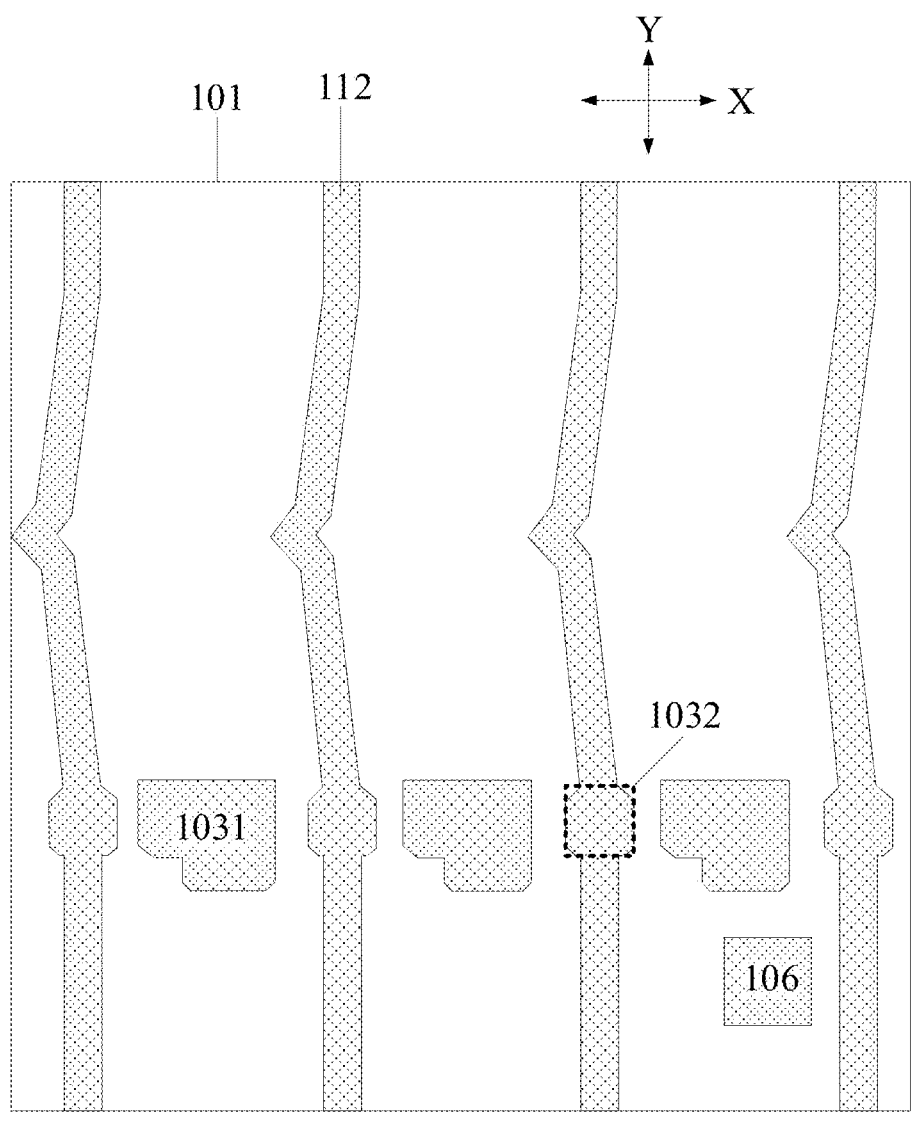
FIG. 9 is a schematic structural diagram of a layer where data lines are located in FIG. 2.

Furthermore, as shown in FIG. 6, the active layer 1034 can be approximately U-shaped; and as shown in FIG. 7, a part of the gate line 107 that overlaps with the active layer 1034 can be used as the gate electrode 1033. In the disclosure, there are two overlapping parts of the gate line 107 and the active layer 1034, so that the transistor 103 has two gate electrodes, forming a dual-gate transistor. Of course, in some embodiments, the active layer 1034 can be approximately I-shaped, and the corresponding transistor 103 may be a single-gate transistor. As shown in FIG. 9, a part of the data line 112 that overlaps with one end of the active layer 1034 can be used as the second electrode 1032, and in order to facilitate the second electrode 1032 to lap the active layer 1034, the part of the data line 112 as the second electrode 1032 can be widen.

Figure 5:
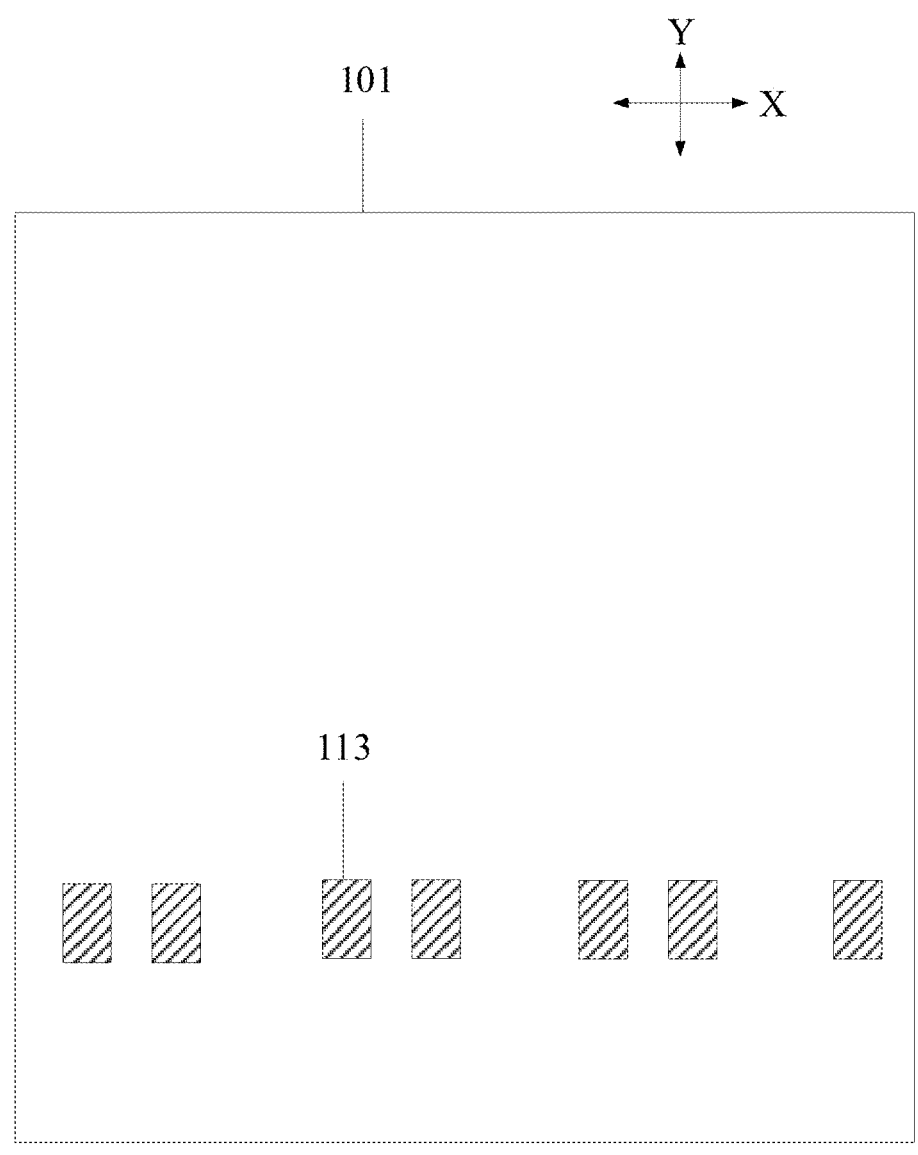
FIG. 5 is a schematic structural diagram of a light blocking layer in FIG. 2.

In some embodiments, as shown in FIGS. 3 to 5, in order to prevent a leakage current in the transistor 103 due to light affecting the active layer 1034, a light blocking layer 113 may further be provided below the active layer 1034 in the disclosure. In some embodiments, in order to improve the transmittance of the display substrate, the light blocking layer 113 only blocks the channel area of the active layer 1034 (equivalent to the area where the gate electrode 1033 is located). Exemplarily, the light blocking layer 113 blocks the channel area of the active layer 1034, and extends relative to the channel area of the active layer 1034 (equivalent to the area where the gate electrode 1033 is located) by 1 μm at one side in the first direction X.

Figure 11:
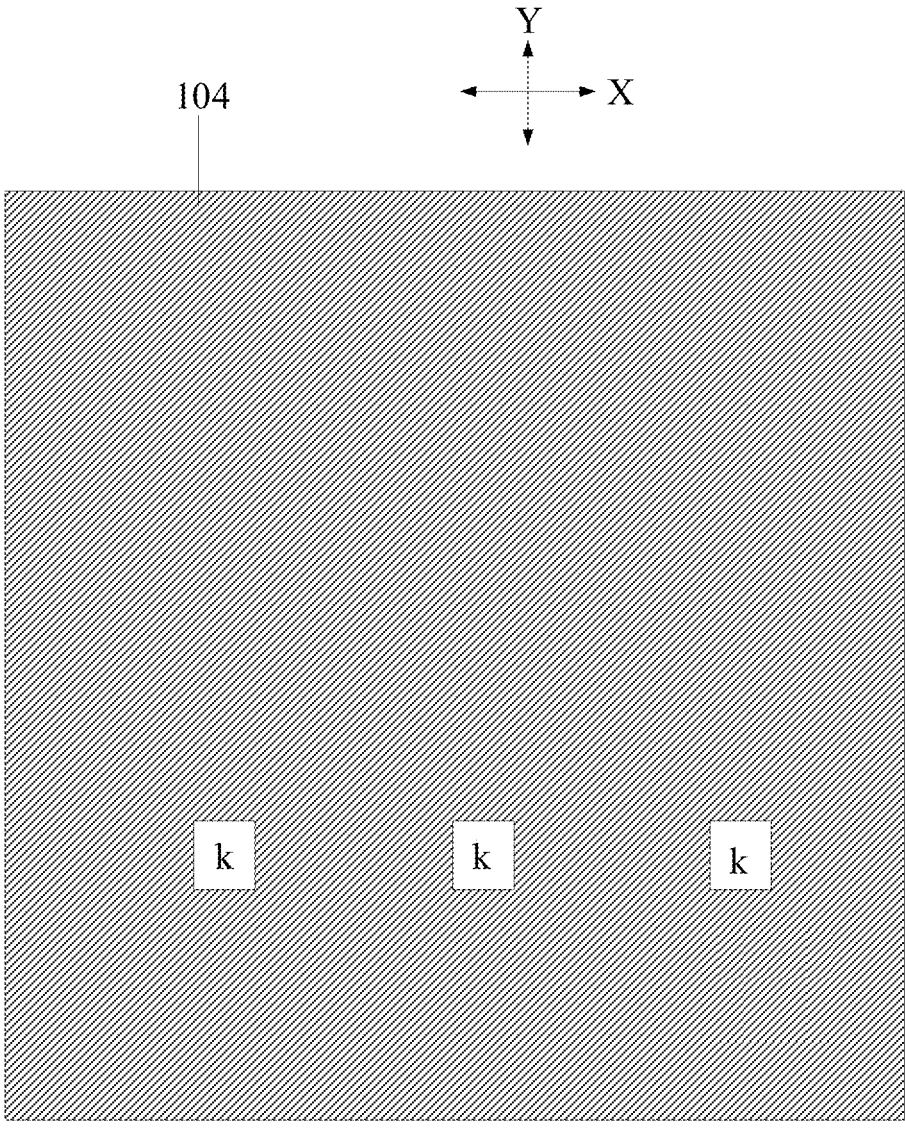
FIG. 11 is a schematic structural diagram of a common electrode in FIG. 2.
Figure 12:
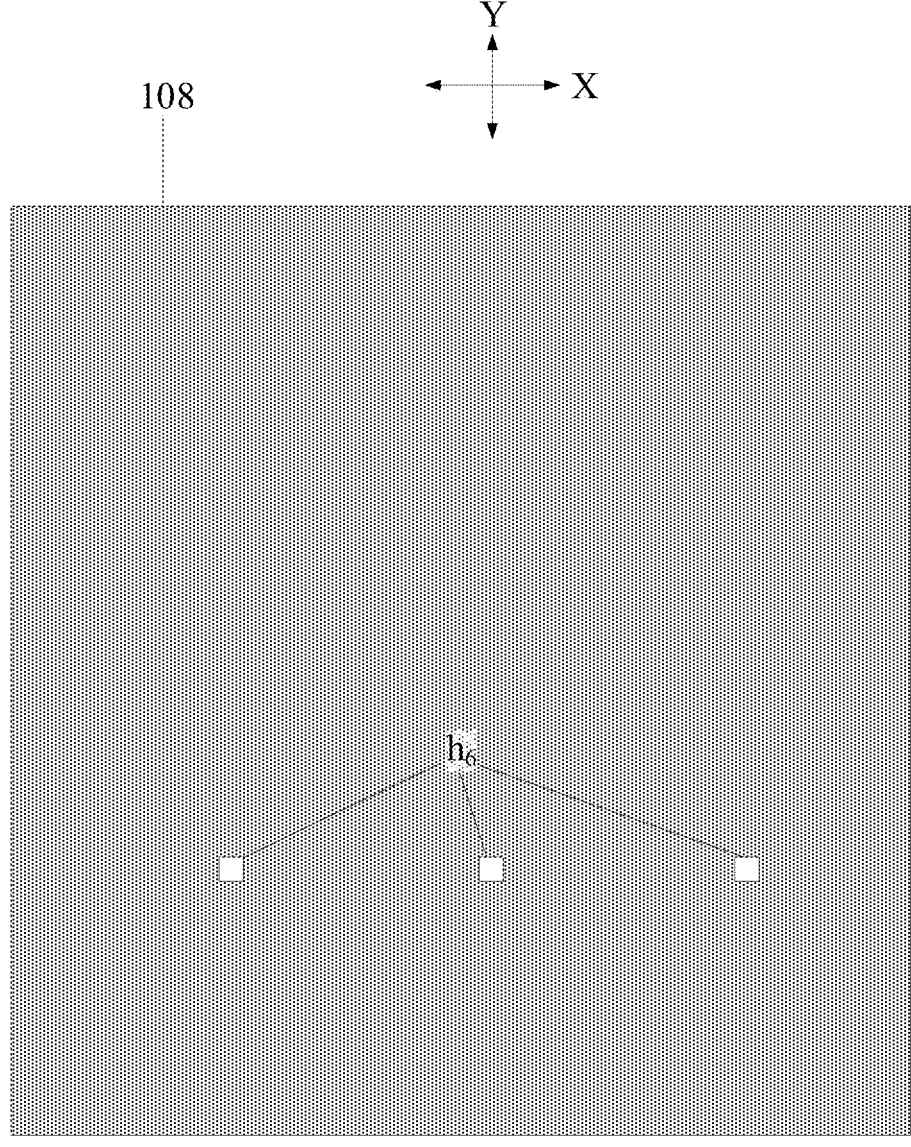
FIG. 12 is a schematic structural diagram of an inorganic insulating layer in FIG. 2.
Figure 13:
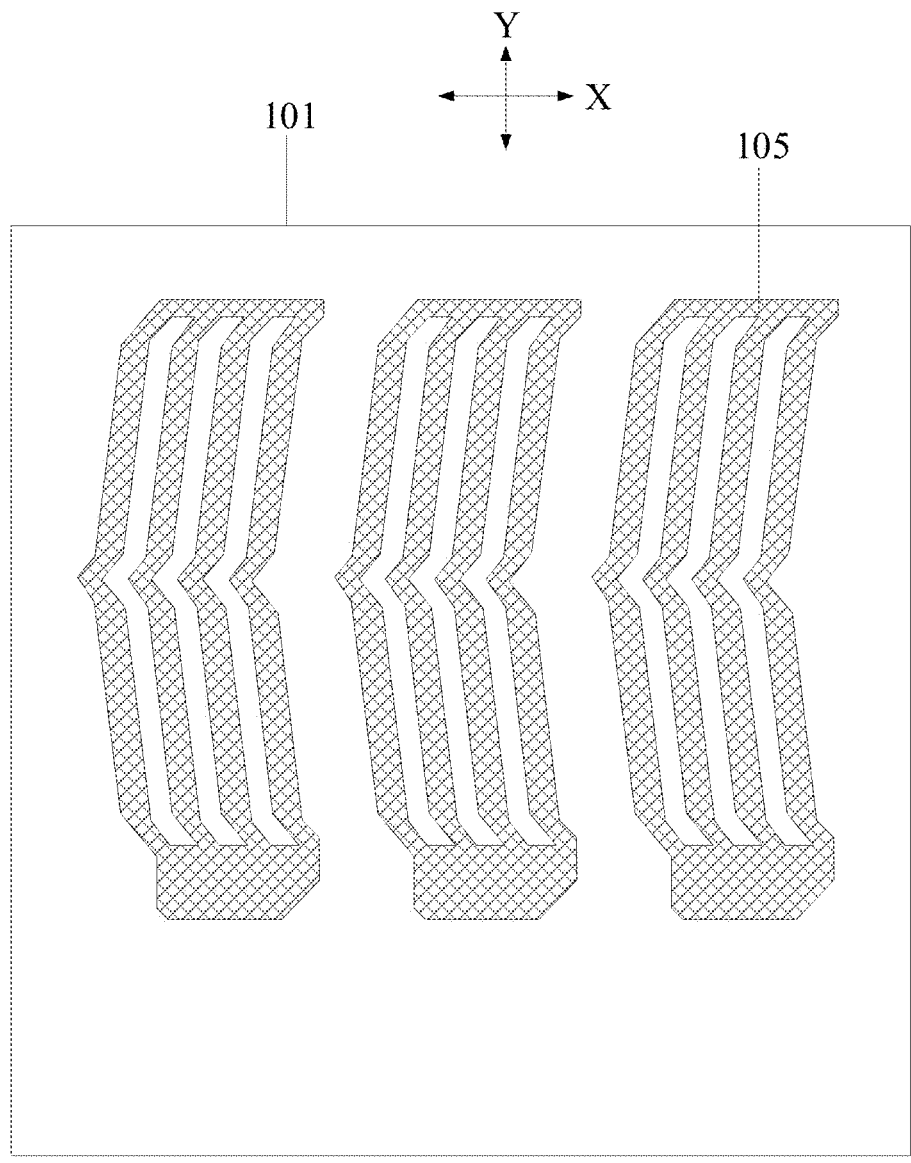
FIG. 13 is a schematic structural diagram of a pixel electrode in FIG. 2.

In some embodiments, in the above display substrate provided in the embodiments of the disclosure, as shown in FIG. 13, the pixel electrode 105 may be a slit electrode, and the common electrode 104 may be a planar electrode. Optionally, as shown in FIGS. 11 and 12, the common electrode 104 has hollow structures k at the positions corresponding to the first vias $h_1$, and the inorganic insulating layer 108 has sixth vias $h_6$ at the positions corresponding to the first vias $h_1$, to allow the pixel electrode 105 to be electrically connected with the first electrode 1031 of the transistor 103 through the sixth via $h_6$, the hollow structure k and the first via $h_1$ that are stacked. In some embodiments, the material of the pixel electrode 105 and the material of the common electrode 104 may be transparent conductive materials such as Indium Tin Oxide (ITO) and Indium Zinc Oxide (IZO) respectively.

In some embodiments, the above display substrate provided in the embodiments of the disclosure may further include other components that should be understood by those ordinary skilled in the art to be included (for example, an orientation layer at the side of the pixel electrode 105 away from the base substrate 101), which will not be described in detail here, and should not be considered as limitations on the disclosure.

Based on the same inventive conception, embodiments of the disclosure further provide a manufacturing method for the above display substrate. Since the principle of the manufacturing method to solve the problem is similar to the principle of the above display substrate to solve the problem, the implementations of the manufacturing method provided in this embodiment of the disclosure can refer to the implementations of the above display substrate, and the repeated description thereof will be omitted.

The manufacturing method for the substrate, as shown in FIG. 24, may include the following steps:

S2401: providing a base substrate; and

S2402: forming an organic layer on the base substrate by using a half-tone mask, where the organic layer includes a planarization layer and a plurality of support structures, the planarization layer includes a plurality of vias, the support structures are disposed on a side of the planarization layer away from the base substrate and provided integrally with the planarization layer, and orthographic projections of the support structures on the base substrate do not overlap with orthographic projections of the vias on the base substrate.

In some embodiments, in the above manufacturing method provided in the embodiments of the disclosure, the above-mentioned S2402 of forming the organic layer on the base substrate by using the half-tone mask may be specifically implemented in the following way.

Figure 25:
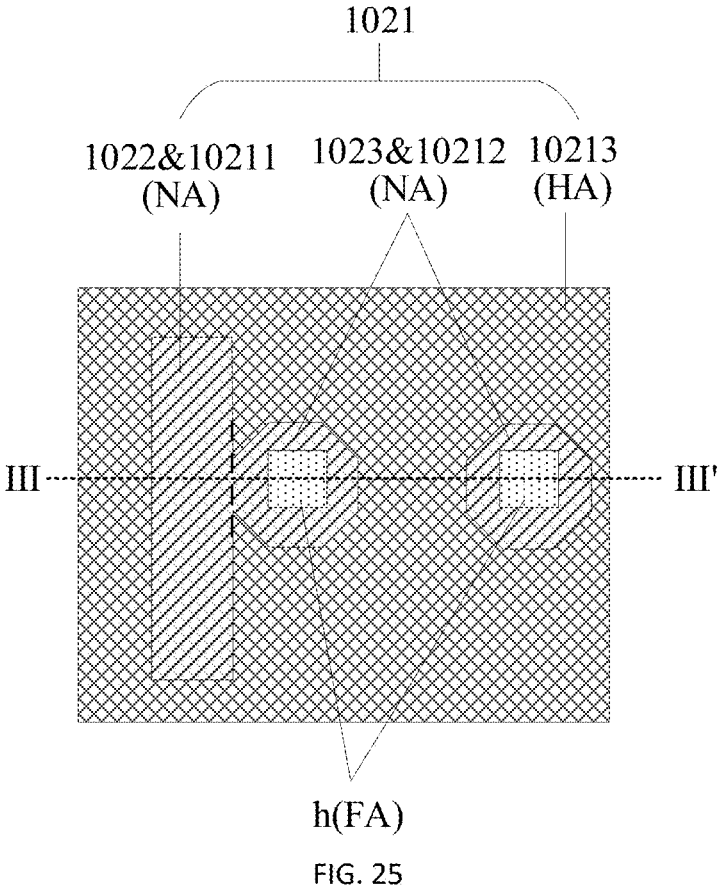
FIG. 25 is a schematic diagram illustrating the manufacturing of the organic layer using the half-tone mask according to embodiments of the disclosure.
Figure 26:
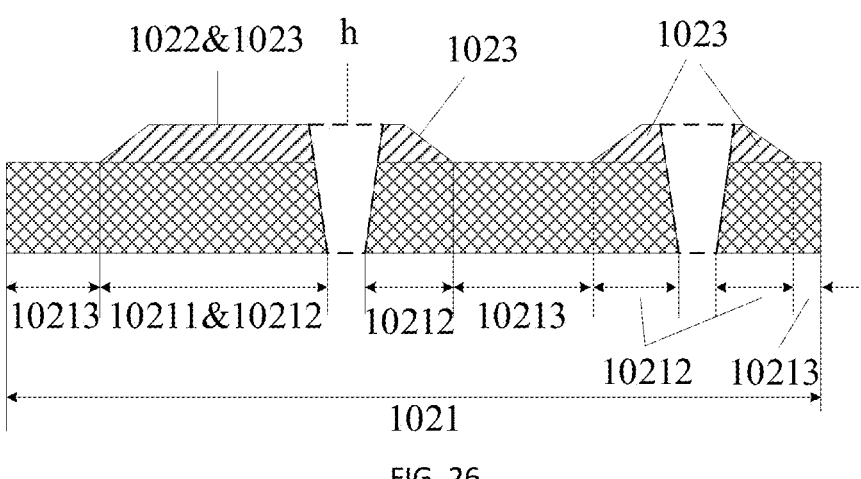
FIG. 26 is a cross-sectional view along line III-III' in FIG. 25.

As shown in FIGS. 25 and 26, a plurality of support structures 1022, a first planarization portion 10211 blocked by the support structures 1022, a plurality of platform structures 1023, and a second planarization portion 10212 blocked by the platform structures 1023 are formed by using an opaque area NA of the half-tone mask; a third planarization portion 10213 not blocked by the support structures 1022 and the platform structures 1023 is formed by using a semi-transmissive area HA of the half-tone mask; and a plurality of vias h passing through the platform structures 1023 and the second planarization portion 10212 are formed by using a fully-transmissive area FA of the half-tone mask, where the planarization layer 1021 of the organic layer 102 includes the first planarization portion 10211, the second planarization portion 10212, and the third planarization portion 10213. Optionally, the transmittance of the semi-transmissive area of the half-tone mask is greater than or equal to 15% and less than or equal to 35%.

It should be noted that, in the above-mentioned manufacturing method provided in the embodiments of the disclosure, the patterning processes involved in forming various layer structures may not only include some or all of deposition, photoresist coating, masking using mask plate, exposure, development, etching, photoresist stripping and others, but also include other processing processes, which are specifically subject to the desired patterns in the actual manufacturing process, and which are not limited here. For example, the post-baking process may also be included after development and before etching. Here, the deposition process may be chemical vapor deposition, plasma enhanced chemical vapor deposition or physical vapor deposition, which is not limited here.

Figure 27:
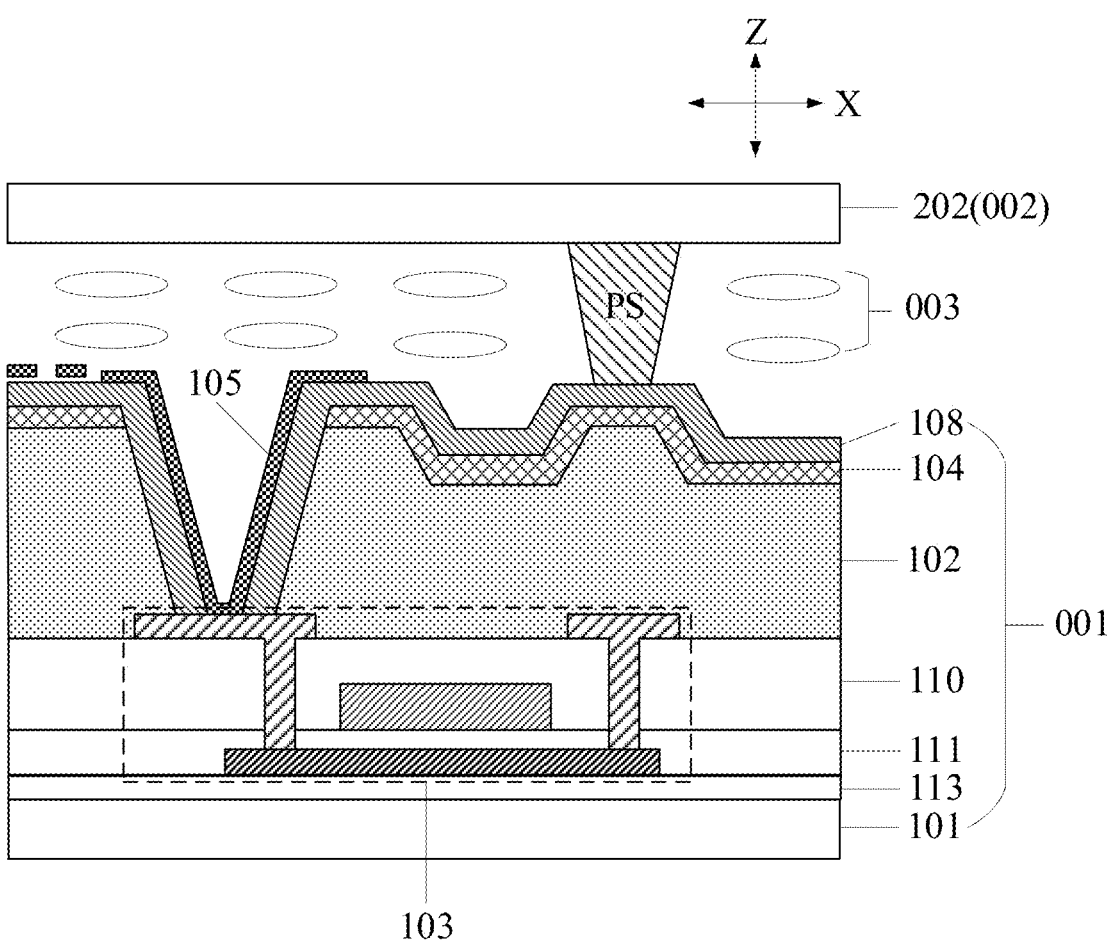
FIG. 27 is a structural schematic diagram of a display panel according to embodiments of the disclosure.
Figure 28:
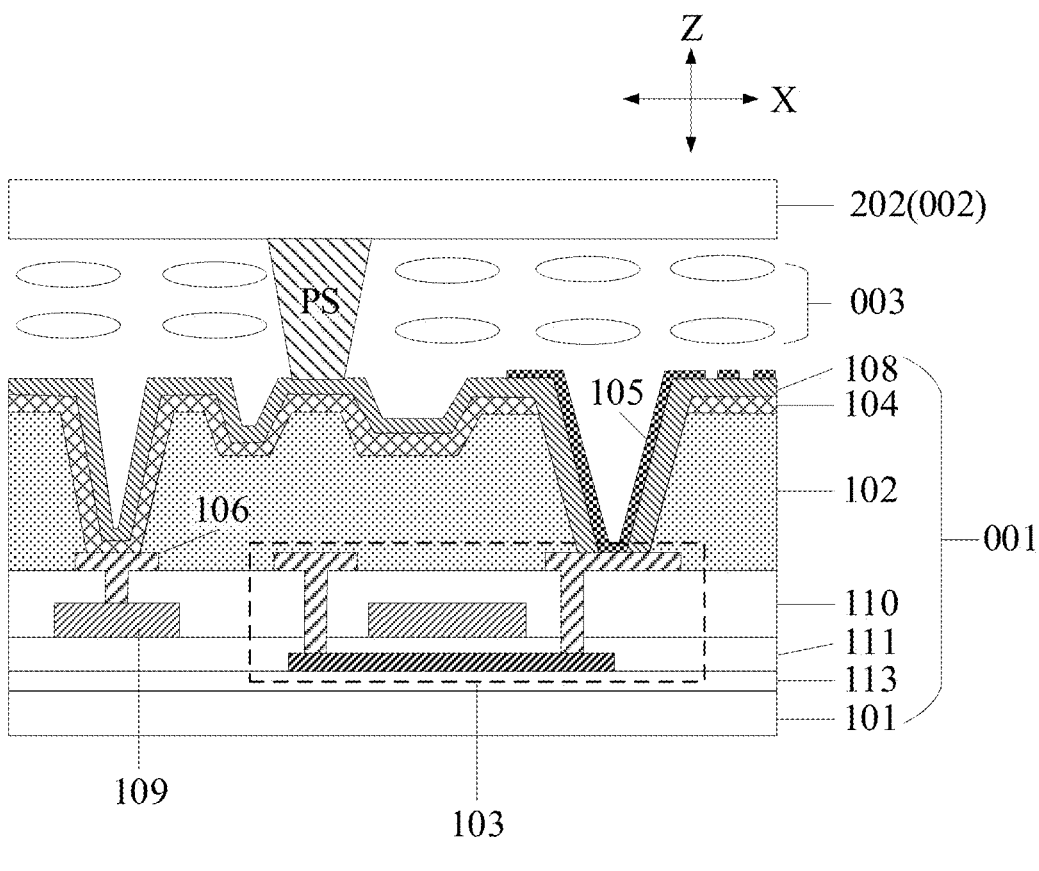
FIG. 28 is another structural schematic diagram of a display panel according to embodiments of the disclosure.

Based on the same inventive conception, embodiments of the disclosure further provide a display panel, as shown in FIGS. 27 and 28, including a display substrate 001 and an opposing substrate 002 opposite to each other, and a liquid crystal layer 003 between the display substrate 001 and the opposing substrate 002, where the display substrate 001 is the above display substrate 001 provided in the embodiments of the disclosure. Since the principle of the display panel to solve the problem is similar to the principle of the above display substrate to solve the problem, the implementations of the display panel provided in the embodiments of the disclosure can refer to the implementations of the above display substrate, and the repeated description thereof will be omitted.

Figure 29:
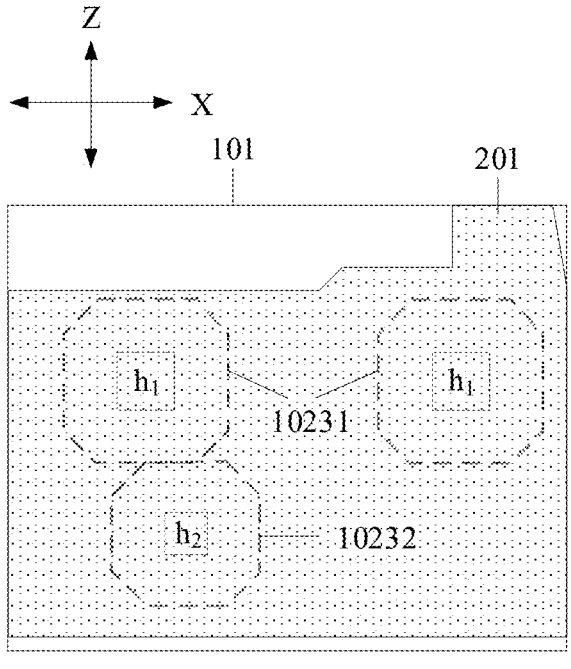
FIG. 29 is yet another structural schematic diagram of a display panel according to embodiments of the disclosure.

In some embodiments, in the above display panel provided in the embodiments of the disclosure, as shown in FIG. 29, the opposing substrate 002 includes a black matrix 201, and orthographic projections of the platform structures (which may include first platform structures 10231 and second platform structures 10232) on the base substrate 101 are located in an orthogonal projection of the black matrix 201 on the base substrate 101, so as to block the platform structures 1023 by the black matrix BM and prevent light leakage at the platform structures 1023.

Optionally, as shown in FIGS. 27 and 28, the opposing substrate 002 may further include a substrate 202, color resistors (not shown in the figures), and the like. Optionally, the black matrix 201 has a grid-like structure, the color resistors may be located within the grids of the grid-like structure, the orthographic projections of the pixel electrodes 105 on the base substrate 101 are located within the orthographic projections of the color resistors on the base substrate 101, and the color resistors may include red color resistors, green color resistors, blue color resistors, etc. In some embodiments, the above opposing substrate 002 provided in the embodiments of the disclosure may further include other components that should be understood by those ordinary skilled in the art to be included (for example, an orientation layer on the side of the layer where the black matrix 201 facing the liquid crystal layer 003), which will not be described in detail here, and should not be considered as limitations on the disclosure.

In some embodiments, the above display panel provided in the embodiments of the disclosure may further include a sealant between the display substrate 001 and the opposing substrate 002 and surrounding the liquid crystal layer 003, a first polarizer located at a side of the display substrate 001 away from the opposing substrate 002, and a second polarizer located at the side of the opposing substrate 002 away from the display substrate 001, etc. A light transmitting axis of the first polarizer is perpendicular to a light transmitting axis of the second polarizer. Furthermore, other components that should be understood by those ordinary skilled in the art to be included will not be described in detail here, and should not be considered as limitations on the disclosure.

Based on the same inventive conception, embodiments of the disclosure further provide a display device, including a backlight module and a display panel located at a light emitting side of the backlight module. The display panel is the above display panel provided in the embodiments of the disclosure. Since the principle of the display device to solve the problem is similar to the principle of the above display panel to solve the problem, the implementations of display device provided in the embodiments of the disclosure can refer to the implementations of the above display panel, and the repeated description thereof will be omitted.

In some embodiments, the above backlight module provided in the embodiments of the disclosure may be a direct-lit backlight module or an edge-lit backlight module. Optionally, the edge-lit backlight module may include a light bar, and a reflective sheet, a light guide plate, a diffusion sheet, a prism group and the like that are stacked, and the light bar is located on a side of the light guide plate in the thickness direction of the light guide plate. The direct-lit backlight module may include a matrix light source, and a reflective sheet, a diffusion plate, a brightness enhancement film and the like stacked on the light-emitting side of the matrix light source. The reflective sheet includes openings arranged facing to positions of lamp beads in the matrix light source. The lamp beads in the light bar and the lamp beads in the matrix light source may be Light-Emitting Diodes (LEDs), such as micro light-emitting diodes (Mini LEDs, Micro LEDs, etc.).

The micro light-emitting diode at the submillimeter or even micron level is a self-luminous device like the Organic Light-Emitting Diode (OLED). Like the organic light-emitting diode, the micro light-emitting diode has advantages such as high brightness, ultra-low latency, and ultra-large viewing angle. Also, the inorganic light-emitting diode emits light based on the metal semiconductor with more stable property and lower resistance, so the inorganic light-emitting diode has the advantages of lower power consumption, better resistance to high and low temperatures, and longer service life than the organic light-emitting diode that emits light based on organic matter. When the micro light-emitting diode is used as the backlight source, the more precise dynamic backlight effect can be achieved, and the glare phenomenon caused by the traditional dynamic backlight between bright and dark areas of the screen can also be prevented while the screen brightness and contrast are effectively improved, optimizing the visual experience.

Figure 30:
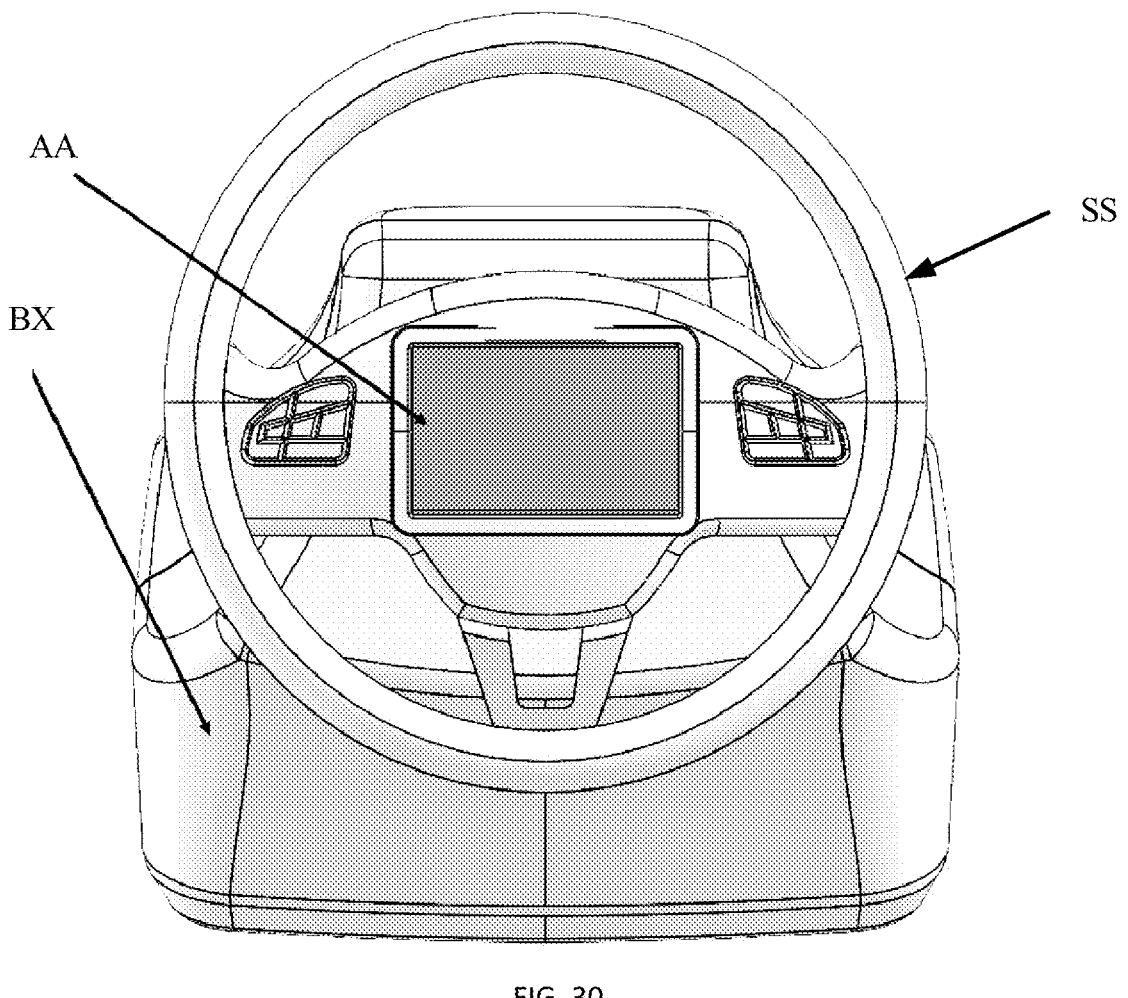
FIG. 30 is a structural schematic diagram of a display device according to embodiments of the disclosure.
Figure 31:
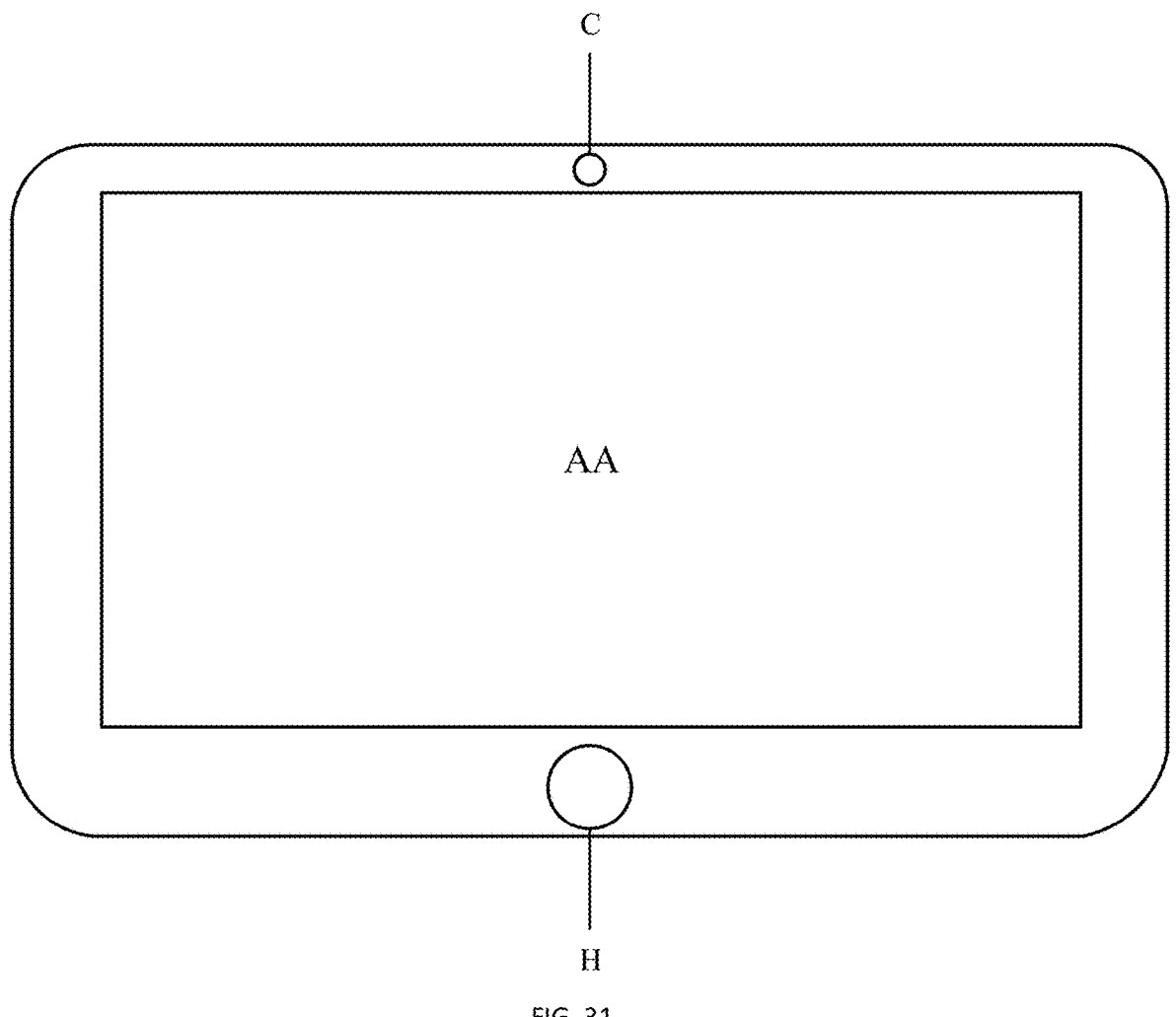
FIG. 31 is another structural schematic diagram of a display device according to embodiments of the disclosure.
Figure 32:
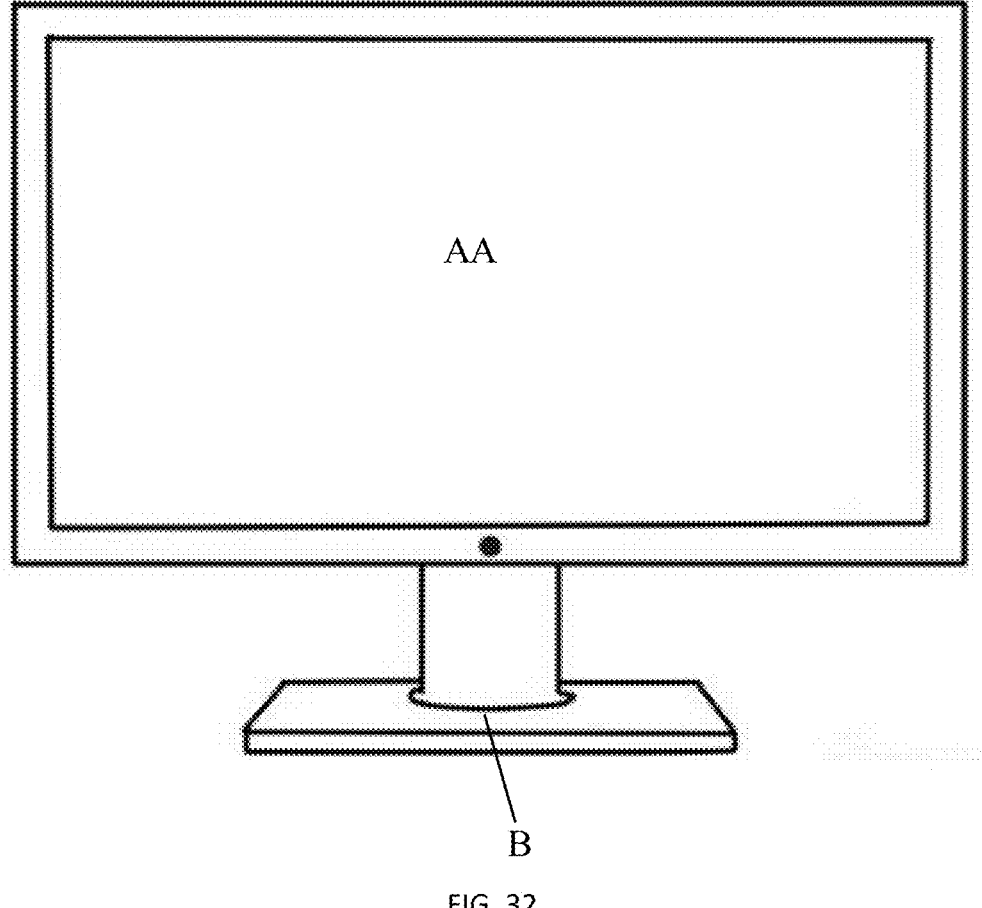
FIG. 32 is yet another structural schematic diagram of a display device according to embodiments of the disclosure.

Optionally, the above-mentioned display device provided in the embodiments of the disclosure can be applicable to medium and large-sized vehicle display products (as shown in FIG. 30), touch screens (TPC, as shown in FIG. 31) and monitors (MNT, as shown in FIG. 32). This is mainly because, first of all, there is no large bending or vibration requirement in small-sized application scenarios, and there is no need to adopt the solution of the disclosure to ensure that the display substrate 001 and the opposing substrate 002 can have a relatively large shift without being affected; and secondly, the small size products pursue high resolution (PPI), and there is not enough space to adopt the solution of the disclosure. Specifically, FIG. 30 shows that the display device of the disclosure is integrated in the central area of the steering wheel SS in a vehicle-mounted display product, and shows the display area AA of the display device and the box BX carrying the steering wheel SS. The box BX can be equipped with a power supply, a control circuit, a radiator and other components inside, which are not limited here. In some embodiments, the display device of the disclosure may be arranged independently of the steering wheel SS, for example, the display device may be a large central control screen arranged near the steering wheel SS or a large sun roof screen on the top of the car, or the display device may be used as a car window, which is not limited here. FIG. 31 shows the return key H (i.e., Home key), display area AA and camera C of the touch screen. FIG. 32 shows the display area AA and base B of the monitor. For the large-size vehicle display products, touch screens and monitors, other components that should be understood by those ordinary skilled in the art to be included will not be described in detail here, and should not be considered as limitations on the disclosure.

In some embodiments, the above-mentioned display device provided in the embodiments of the disclosure may further include, but is not limited to: a radio frequency unit, a network module, an audio output&input unit, a sensor, a display unit, a user input unit, an interface unit, a control chip and other components. Optionally, the control chip is a central processing unit, a digital signal processor, a system on chip (SoC), etc. For example, the control chip may also include a memory, a power module, etc., and realize the power supply and signal input and output functions through additional wires, signal lines, etc. For example, the control chip may further include hardware circuits and computer executable codes. The hardware circuits may include conventional Very Large Scale Integration (VLSI) circuits or gate arrays, and existing semiconductors or other discrete components such as logic chips and transistors; and the hardware circuits may further include field programmable gate arrays, programmable array logic, programmable logic devices, etc. Furthermore, those skilled in the art can understand that the above-mentioned structure does not constitute a limitation on the above display device provided in the embodiments of the disclosure. In other words, the above display device provided in the embodiments of the disclosure may include more or fewer components than the above components, or combine certain components, or use different component arrangements.

Evidently, those skilled in the art can make various modifications and variations to the embodiments of the disclosure without departing from the spirit and scope of the embodiments of the disclosure. Thus, the disclosure is also intended to encompass these modifications and variations to the embodiments of the disclosure as long as these modifications and variations come into the scope of the claims of the disclosure and their equivalents.

What is claimed is:

1. A display substrate, comprising:
   a base substrate; and
   an organic layer disposed at a side of the base substrate and comprising a planarization layer and a plurality of support structures, wherein the planarization layer comprises a plurality of vias, the plurality of support structures are disposed on a side of the planarization layer away from the base substrate and integrated with the planarization layer, and orthographic projections of the plurality of support structures on the base substrate do not overlap with orthographic projections of the plurality of vias on the base substrate;
   wherein the support structure is configured to support a spacer;
   the organic layer further comprises a plurality of platform structures disposed on the side of the planarization layer away from the base substrate and integrated with the planarization layer, and the plurality of vias extend along a direction from the base substrate to the organic layer to pass through the platform structures;
   the platform structure is disposed around the via;
   the plurality of support structures and the plurality of platform structures protrude relative to other regions of the planarization layer;

a thickness of the platform structure protruding from the planarization layer is substantially same as a thickness of the support structure protruding from the planarization layer in the direction from the base substrate to the organic layer;
   a sum of the thickness of the platform structure protruding from the planarization layer and a thickness of the planarization layer is greater than a thickness of a region of the planarization layer where neither the platform structure nor the support structure is provided, and a sum of the thickness of the support structure protruding from the planarization layer and the thickness of the planarization layer is greater than the thickness of the region of the planarization layer where neither the platform structure nor the support structure is provided;
   a minimum distance between an outer surface of the platform structure away from the via and the via is greater than or equal to 5 μm;
   the plurality of platform structures comprise a plurality of first platform structures;
   a part of the plurality of first platform structures is integrated with the plurality of support structures.

2. The display substrate according to claim 1, further comprising a plurality of transistors between the organic layer and the base substrate, and a plurality of pixel electrodes located at a side of the organic layer away from the base substrate;
   the plurality of vias comprise a plurality of first vias, wherein the first via connects a first electrode of the transistor with the pixel electrode; and
   the first via passes through the first platform structure.

3. The display substrate according to claim 1, wherein a minimum distance between the first platform structure and the support structure is less than 2 μm.

4. The display substrate according to claim 1, wherein an aperture of the via gradually increases in the direction from the base substrate to the organic layer, and a minimum distance between a top end of the first via and the support structure is greater than or equal to 2 μm.

5. The display substrate according to claim 1, further comprising a plurality of first link parts for connecting the support structures with the first platform structures.

6. The display substrate according to claim 2, further comprising a common electrode between a layer where the plurality of pixel electrodes are located and the organic layer, and a plurality of transfer electrodes in a same layer and made of a same material as the first electrodes of the transistors;
   wherein the plurality of vias further comprise a plurality of second vias, wherein the second via connects the common electrode with the transfer electrode; and
   the plurality of platform structures comprise a plurality of second platform structures, wherein the second via passes through the second platform structure.

7. The display substrate according to claim 6, wherein the plurality of second platform structures are integrated with a part of the plurality of first platform structures; and
   the plurality of second platform structures and the plurality of support structures are integrated with different first platform structures respectively.

8. The display substrate according to claim 7, further comprising a plurality of second link parts for connecting the second platform structures with the first platform structures.

9. The display substrate according to claim 1, wherein a surface of the organic layer away from the base substrate is uneven.

10. The display substrate according to claim 1, further comprising a plurality of gate lines between the organic layer and the base substrate and extending in a first direction and arranged in a second direction, wherein the first direction intersects the second direction;

wherein a size of the support structure gradually decreases in a direction from the base substrate to the organic layer;

the support structure comprises a top base away from the base substrate, wherein a width of the top base in the first direction is greater than or equal to 6 μm and less than or equal to 12 μm, and a length of the support structure in the second direction is greater than or equal to 25 μm and less than or equal to 50 μm.

11. The display substrate according to claim 1, wherein a slope angle of the support structure is greater than or equal to 30° and less than or equal to 60°.

12. The display substrate according to claim 1, wherein at least one of following is comprised:

the thickness of the planarization layer in the direction from the base substrate to the organic layer is greater than 2 μm; and/or the thickness of the platform structure in the direction from the base substrate to the organic layer is greater than or equal to 0.5 μm and less than or equal to 1.2 μm.

13. A manufacturing method for the display substrate according to claim 1, comprising:

providing the base substrate; and forming the organic layer on the base substrate by using a half-tone mask.

14. The manufacturing method according to claim 13, wherein forming the organic layer on the base substrate by using the half-tone mask comprises:

forming the plurality of support structures, a first planarization portion blocked by the support structures, the plurality of platform structures, and a second planarization portion blocked by the platform structures by using an opaque area of the half-tone mask;

forming a third planarization portion not blocked by the support structures and the platform structures by using a semi-transmissive area of the half-tone mask; and forming the plurality of vias passing through the platform structures and the second planarization portion by using a fully-transmissive area of the half-tone mask;

wherein the planarization layer of the organic layer comprises the first planarization portion, the second planarization portion, and the third planarization portion.

15. The manufacturing method according to claim 13, wherein a transmittance of the semi-transmissive area of the half-tone mask is greater than or equal to 15% and less than or equal to 35%.

16. A display panel, comprising:

the display substrate according to claim 1;

an opposing substrate arranged opposite to the display substrate; and a liquid crystal layer between the display substrate and the opposing substrate.

* * * * *